United States Patent
Hyde et al.

(10) Patent No.: US 8,595,037 B1
(45) Date of Patent: Nov. 26, 2013

(54) SYSTEMS AND METHODS FOR INSURANCE BASED ON MONITORED CHARACTERISTICS OF AN AUTONOMOUS DRIVE MODE SELECTION SYSTEM

(75) Inventors: Roderick A. Hyde, Redmond, WA (US); Jordin T. Kare, Seattle, WA (US); David B. Tuckerman, Lafayette, CA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/466,902

(22) Filed: May 8, 2012

(51) Int. Cl.
 *G06Q 40/00* (2012.01)
 *G06F 7/00* (2006.01)

(52) U.S. Cl.
 USPC ...................................... 705/4; 701/2; 701/36

(58) Field of Classification Search
 None
 See application file for complete search history.

(56) References Cited

U.S. PATENT DOCUMENTS

| | | | |
|---|---|---|---|
| 6,064,970 A | 5/2000 | McMillan et al. | |
| 6,246,933 B1 * | 6/2001 | Bague | 701/32.2 |
| 6,295,502 B1 | 9/2001 | Hancock et al. | |
| 6,438,472 B1 * | 8/2002 | Tano et al. | 701/29.6 |
| 6,445,983 B1 * | 9/2002 | Dickson et al. | 701/23 |
| 6,573,831 B2 * | 6/2003 | Ikeda et al. | 340/505 |
| 6,647,328 B2 | 11/2003 | Walker | |
| 6,950,013 B2 | 9/2005 | Scaman et al. | |
| 6,965,816 B2 | 11/2005 | Walker | |
| 7,190,260 B2 | 3/2007 | Rast | |
| 7,512,516 B1 | 3/2009 | Widmann | |
| 7,821,421 B2 | 10/2010 | Tamir et al. | |
| 7,859,392 B2 * | 12/2010 | McClellan et al. | 340/441 |
| 8,031,085 B1 * | 10/2011 | Anderson | 340/988 |
| 8,090,598 B2 | 1/2012 | Bauer et al. | |
| 8,140,358 B1 | 3/2012 | Ling et al. | |
| 8,180,514 B2 * | 5/2012 | Kaprielian et al. | 701/27 |
| 2001/0033661 A1 | 10/2001 | Prokoski | |
| 2001/0056544 A1 | 12/2001 | Walker | |
| 2002/0010935 A1 | 1/2002 | Sitnik | |
| 2002/0041240 A1 * | 4/2002 | Ikeda et al. | 340/993 |
| 2002/0111725 A1 | 8/2002 | Burge | |
| 2002/0174360 A1 * | 11/2002 | Ikeda | 713/200 |
| 2002/0198632 A1 | 12/2002 | Breed et al. | |
| 2003/0093187 A1 | 5/2003 | Walker | |
| 2003/0149530 A1 | 8/2003 | Stopczynski | |
| 2003/0158758 A1 | 8/2003 | Kanazawa et al. | |

(Continued)

FOREIGN PATENT DOCUMENTS

WO WO 03/001474 A2 1/2003

OTHER PUBLICATIONS

Excerpt: Zhu et al., U.S. Appl. No. 61/391,271, Oct. 8, 2010; 3-pages.*

(Continued)

*Primary Examiner* — Gregory Johnson

(57) ABSTRACT

A property of an insurance policy may be determined, at least in part, upon characteristics of a vehicle autonomous drive mode selection system. The characteristics may pertain to any capability, configuration, and/or operating state of the autonomous drive mode selection system (and/or vehicle). For example, a property of the insurance policy may be based upon whether the autonomous drive mode selection system is enabled or disabled. In some embodiments, the property of the insurance policy may be based upon which of one or more autonomous driving modes is selected via an autonomous drive mode selection system. The property of the insurance policy may be dynamic, and may be updated in response to changes to the autonomous drive mode selection system.

40 Claims, 15 Drawing Sheets

(56) References Cited

U.S. PATENT DOCUMENTS

| | | | |
|---|---|---|---|
| 2003/0221118 A1 | 11/2003 | Walker | |
| 2004/0085198 A1* | 5/2004 | Saito et al. | 340/438 |
| 2004/0139034 A1 | 7/2004 | Farmer | |
| 2004/0153362 A1 | 8/2004 | Bauer et al. | |
| 2005/0055248 A1 | 3/2005 | Helitzer et al. | |
| 2005/0065682 A1* | 3/2005 | Kapadia et al. | 701/35 |
| 2005/0065711 A1* | 3/2005 | Dahlgren et al. | 701/117 |
| 2005/0091175 A9 | 4/2005 | Farmer | |
| 2005/0125117 A1* | 6/2005 | Breed | 701/29 |
| 2005/0187677 A1 | 8/2005 | Walker | |
| 2006/0089766 A1 | 4/2006 | Allard et al. | |
| 2006/0213359 A1* | 9/2006 | Vitale et al. | 89/1.11 |
| 2006/0287783 A1 | 12/2006 | Walker | |
| 2007/0032952 A1 | 2/2007 | Carlstedt et al. | |
| 2007/0219720 A1* | 9/2007 | Trepagnier et al. | 701/300 |
| 2007/0225912 A1* | 9/2007 | Grush | 701/213 |
| 2007/0273495 A1 | 11/2007 | Kesterson | |
| 2007/0287473 A1* | 12/2007 | Dupray | 455/456.1 |
| 2008/0027591 A1* | 1/2008 | Lenser et al. | 701/2 |
| 2008/0033604 A1* | 2/2008 | Margolin | 701/2 |
| 2008/0065401 A1* | 3/2008 | Abrahamson | 705/1 |
| 2008/0091309 A1 | 4/2008 | Walker | |
| 2008/0114530 A1* | 5/2008 | Petrisor et al. | 701/117 |
| 2008/0221776 A1* | 9/2008 | McClellan | 701/103 |
| 2008/0234907 A1 | 9/2008 | Labuhn et al. | |
| 2008/0243378 A1 | 10/2008 | Zavoli | |
| 2008/0243558 A1 | 10/2008 | Gupte | |
| 2008/0252487 A1* | 10/2008 | McClellan et al. | 340/936 |
| 2008/0255722 A1* | 10/2008 | McClellan et al. | 701/35 |
| 2008/0258890 A1* | 10/2008 | Follmer et al. | 340/439 |
| 2008/0262670 A1* | 10/2008 | McClellan et al. | 701/29 |
| 2008/0294690 A1* | 11/2008 | McClellan et al. | 707/104.1 |
| 2008/0320036 A1 | 12/2008 | Winter | |
| 2009/0051510 A1* | 2/2009 | Follmer et al. | 340/425.5 |
| 2009/0157566 A1* | 6/2009 | Grush | 705/400 |
| 2009/0174573 A1* | 7/2009 | Smith | 340/905 |
| 2009/0192710 A1 | 7/2009 | Eidehall et al. | |
| 2009/0210257 A1 | 8/2009 | Chalfant et al. | |
| 2009/0327066 A1 | 12/2009 | Flake et al. | |
| 2010/0010742 A1 | 1/2010 | Mochizuki | |
| 2010/0039313 A1 | 2/2010 | Morris | |
| 2010/0097208 A1* | 4/2010 | Rosing et al. | 340/539.13 |
| 2010/0106344 A1* | 4/2010 | Edwards et al. | 701/2 |
| 2010/0106356 A1* | 4/2010 | Trepagnier et al. | 701/25 |
| 2010/0131303 A1* | 5/2010 | Collopy et al. | 705/4 |
| 2010/0131304 A1 | 5/2010 | Collopy et al. | |
| 2010/0131307 A1* | 5/2010 | Collopy et al. | 705/4 |
| 2010/0131308 A1* | 5/2010 | Collopy et al. | 705/4 |
| 2010/0141518 A1* | 6/2010 | Hersey et al. | 342/357.09 |
| 2010/0164789 A1 | 7/2010 | Basnayake | |
| 2010/0174566 A1 | 7/2010 | Helitzer et al. | |
| 2010/0188201 A1 | 7/2010 | Cook et al. | |
| 2010/0214085 A1 | 8/2010 | Avery et al. | |
| 2010/0256836 A1* | 10/2010 | Mudalige | 701/2 |
| 2010/0262364 A1* | 10/2010 | Ikeda | 701/207 |
| 2010/0332266 A1 | 12/2010 | Tamir et al. | |
| 2011/0010023 A1 | 1/2011 | Kunzig et al. | |
| 2011/0040579 A1 | 2/2011 | Havens | |
| 2011/0106442 A1 | 5/2011 | Desai et al. | |
| 2011/0122026 A1 | 5/2011 | DeLaquil et al. | |
| 2011/0130913 A1* | 6/2011 | Duggan et al. | 701/23 |
| 2011/0161116 A1 | 6/2011 | Peak et al. | |
| 2011/0161244 A1* | 6/2011 | Iyer et al. | 705/36 R |
| 2011/0213628 A1 | 9/2011 | Peak et al. | |
| 2011/0254708 A1* | 10/2011 | Anderson | 340/988 |
| 2011/0267205 A1* | 11/2011 | McClellan et al. | 340/936 |
| 2011/0270476 A1* | 11/2011 | Doppler et al. | 701/22 |
| 2012/0028680 A1* | 2/2012 | Breed | 455/556.1 |
| 2012/0050089 A1 | 3/2012 | Gurevich et al. | |
| 2012/0072051 A1* | 3/2012 | Koon et al. | 701/2 |
| 2012/0072241 A1 | 3/2012 | Krause et al. | |
| 2012/0083960 A1* | 4/2012 | Zhu et al. | 701/23 |
| 2012/0089423 A1 | 4/2012 | Tamir et al. | |
| 2012/0101921 A1* | 4/2012 | Anderson et al. | 705/30 |
| 2012/0123806 A1 | 5/2012 | Schumann, Jr. et al. | |
| 2012/0209634 A1 | 8/2012 | Ling et al. | |
| 2012/0249341 A1* | 10/2012 | Brown et al. | 340/902 |
| 2012/0259666 A1 | 10/2012 | Collopy et al. | |
| 2012/0268235 A1* | 10/2012 | Farhan et al. | 340/3.1 |
| 2012/0271500 A1* | 10/2012 | Tsimhoni et al. | 701/23 |
| 2012/0296539 A1* | 11/2012 | Cooprider et al. | 701/70 |

OTHER PUBLICATIONS

Excerpt: Zhu et al., U.S. Appl. No. 61/391,271, filed Oct. 8. 2010; 3-pages.*
U.S. Appl. No. 13/544,799, Bowers et al.
U.S. Appl. No. 13/544,770, Bowers et al.
U.S. Appl. No. 13/544,757, Bowers et al.
U.S. Appl. No. 13/466,910, Hyde et al.
U.S. Appl. No. 13/401,631, Hagelstein et al.
U.S. Appl. No. 13/041,566, Hagelstein et al.
PCT International Search Report; International App. No. PCT/US2013/027151; Apr. 26, 2013; pp. 1-2 (plus 2 pages of Search History).
PCT International Search Report; International App. No. PCT/US2013/049571; Sep. 17, 2013; pp. 1-2.
PCT International Search Report; International App. No. PCT/US2013/049579; Sep. 24, 2013; pp. 1-2.
Li et al.; "Multi-user Data Sharing in Radar Sensor Networks"; SenSys-07 Proceedings of the 5th International conference on Embedded networked sensor systems; Nov. 2007; pp. 247-260; ACM Digital Library; Landon IP Inc.; retrieved from: http://none.cs.umas.edu/papers/pdf/SenSys07-Utility.pdf.
PCT International Search Report; International App. No. PCT/US13/49583; Sep. 4, 2013; pp. 1-2.

* cited by examiner

SYSTEMS AND METHODS FOR INSURANCE BASED ON MONITORED CHARACTERISTICS OF AN AUTONOMOUS DRIVE MODE SELECTION SYSTEM

TECHNICAL FIELD

This disclosure relates to systems and methods for determining a property and insurance policy based, at least in part, upon characteristics of an autonomous drive mode selection system.

SUMMARY

One or more properties of an insurance policy may be based, at least in part, upon a characteristic of an autonomous drive mode selection system of a vehicle. As used herein, an autonomous drive mode selection system refers to any system allowing a user and/or automated system to select between various autonomous driving modes. Examples of autonomous driving modes include a local robotically-controlled mode, a remote manually-controlled mode, and a remote robotically-controlled mode. Accordingly, a user and/or automated system may select between a traditional locally-controlled manual mode, in which the vehicle operator manually controls the vehicle from within the vehicle (e.g., via pedals and a steering wheel), and one or more autonomous driving modes. In some embodiments, a local manually-controlled mode, and/or one or more of the autonomous driving modes may not be available in a vehicle.

An "insurance policy" may refer to a risk-transference contract between an insurer and an insured (policy provider and policy holder) in which the insurer agrees to satisfy qualifying claims brought by the insured. An insurance policy may include, but is not limited to, one or more of: a vehicle insurance policy, a health insurance policy, a life insurance policy, a disability insurance policy, a workers' compensation insurance policy, a group insurance policy, a local robot insurance policy, a remote robot insurance policy, or the like. The "insurer" may be any entity responsible for satisfying claims under the insurance policy, and may include an agent of the insurer (e.g., employee, independent contractor, or other authorized entity), an underwriter, a re-insurer, or the like. As used herein, an insurance policy may pertain to any asset or entity including, but not limited to: a vehicle, a fleet of vehicles, an operator of a vehicle, a passenger of a vehicle, an owner of a vehicle, an entity having a security interest in a vehicle, an entity having a relationship with an operator, a passenger, and/or an owner of the vehicle (e.g., an employer of the vehicle operator), an owner of a local or remote robot, an entity having a security interest in a local or remote robot, and so on. As used herein, a "property" of an insurance policy includes, but is not limited to, one or more of: a term of the insurance policy, eligibility for coverage under the insurance policy, a premium of the insurance policy, a coverage amount of the insurance policy, a deductible of the insurance policy, a rider of the insurance policy, a limitation of the insurance policy, a coverage scope of the insurance policy, the coverage of a particular event under the insurance policy, or the like. Although the specific example of insurance policies are disclosed herein, the disclosure is not limited in this regard and could be adapted to any suitable risk-transference and/or risk-mitigation mechanisms.

A "robot" as used herein includes, but is not limited to, any type of computerized system configured to autonomously or semi-autonomously operate a vehicle. A robot may be configured to autonomously operate all aspects of a vehicle or only particular portions of the vehicle, and/or only during particular events. For example, a robot may be configured to operate a vehicle by controlling the acceleration, deceleration, and/or steering of the vehicle. A robot may be configured to operate a vehicle during normal driving (e.g., on a road, highway, or freeway) or only during certain events, such as parking or reversing. A robot may be physically located within a vehicle (local), or the robot may be physically located at a remote location and provide instructions to a local controller within the vehicle (remote). Alternatively, the robot may include local portions and remote portions, in which case the robot may be considered either remote or local depending on the primary processing system of the robot.

Characteristics upon which a property of an insurance policy may be based may include capabilities of the autonomous drive mode selection system, the configuration of the autonomous drive mode selection system, the operating state of the autonomous drive mode selection system (and/or vehicle), and so on. Examples of such characteristics include, but are not limited to: whether the vehicle has an autonomous drive mode selection system; an identifier of the vehicle autonomous drive mode selection system (e.g., model name, manufacturer, version, firmware revision, etc.); sensors utilized by the autonomous drive mode selection system; the vehicle autonomous drive mode selection system configuration; an autonomous driving mode selection made via the autonomous drive mode selection system (e.g., a local robotically-controlled mode, a remote manually-controlled mode, and a remote robotically-controlled mode); autonomous drive mode selection system specifications, such as accuracy, communication network capabilities, and the like; recording functionality; usage and/or configuration history of the autonomous drive mode selection system; and so on. Accordingly, an autonomous drive mode selection system characteristic may refer to a static characteristic of the autonomous drive mode selection system (e.g., the capabilities of the system), a dynamic characteristic, and/or an operating state of the autonomous drive mode selection system and/or vehicle. Although particular examples of autonomous drive mode selection system characteristics are described herein, the disclosure is not limited in this regard; the teachings of this disclosure could be adapted to determine insurance policy properties using any autonomous drive mode selection system characteristic.

Additionally, external characteristics, such as the weather, visibility, current traffic conditions, road conditions, location, lighting conditions, time of day, and so on may be used to determine an insurance property in conjunction with the drive mode selection system. For example, depending on the capabilities of the autonomous driving modes available via a drive mode selection system in a vehicle, an insurance property may increase or decrease for a particular autonomous driving mode based on one or more of the external characteristics.

In some embodiments, a monitor module (or other entity) monitors a characteristic of an autonomous drive mode selection system and provides the monitored characteristic to the insurer (or agent thereof). The insurer may determine, or at least partially determine, one or more properties of the insurance policy based upon the characteristic. The property of the insurance policy may be determined as the policy is being established. Alternatively, or in addition, the property of the insurance policy may be dynamic, and may change as updated and/or revised characteristics are received. For example, a property of the insurance policy may change depending upon usage characteristics of the autonomous drive mode selection system (e.g., a comparison of vehicle operating time during which the autonomous drive mode selection system was active to operating time during which the autonomous drive mode selection system was not active). In another example, a coverage limit of the insurance policy for a particular event (e.g., accident) may be based upon an operating state of the autonomous drive mode selection system (and/or vehicle) when the event occurred. Accordingly, the relationship between insurance policy properties and autonomous drive mode selection system characteristics disclosed herein may create economic incentives promoting the deployment and proper use of vehicle autonomous drive mode selection systems.

DETAILED DESCRIPTION

Figure 1:
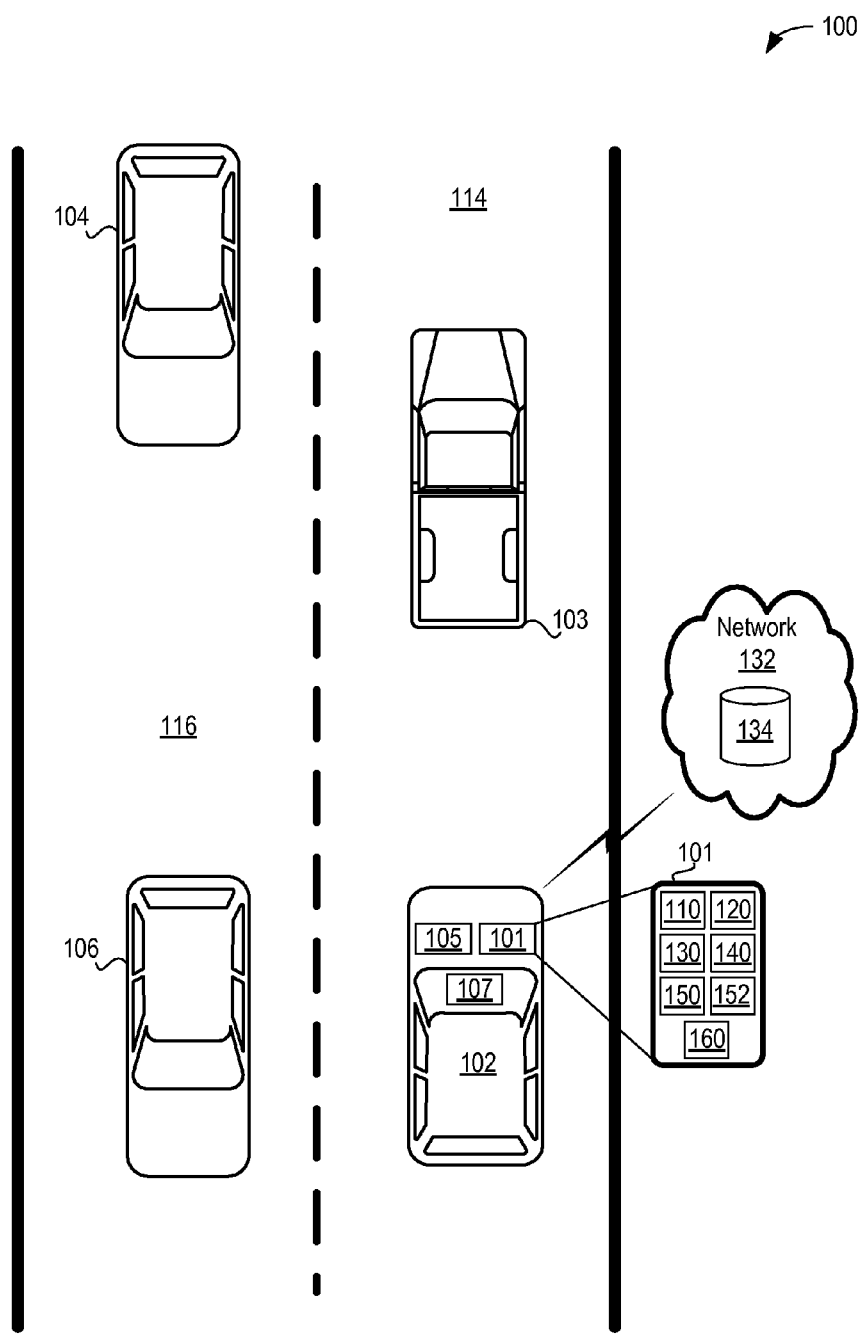
FIG. 1 depicts one embodiment of several vehicles on a road, one of which includes an autonomous drive mode selection system.

A monitor module (or other entity) may monitor a characteristic of an autonomous drive mode selection system in a vehicle and provide the monitored characteristic to an insurer. The autonomous drive mode selection system may allow a user (such as an operator of the vehicle) or a robotic control system to select between a local robotically-controlled mode, a remote manually-controlled mode, and a remote robotically-controlled mode, in addition to a traditional locally-controlled manual mode. Accordingly, a user and/or automated system may select between a traditional locally-controlled manual mode, in which the vehicle operator manually controls the vehicle from within the vehicle (e.g., via pedals and a steering wheel), and one or more autonomous driving modes. In some embodiments, one or more driving modes may be unavailable and/or alternative driving modes may be available as selections via an autonomous drive mode selection system. In one embodiment, a vehicle may include an autonomous drive mode selection system with a single autonomous driving mode that can be enabled or disabled. The autonomous driving mode may pertain to the complete operation of the vehicle, or may pertain to a limited portion of the operation of the vehicle. As a specific example, an autonomous drive mode selection system may be limited to an automatic parallel parking system.

The characteristic of the autonomous drive mode selection system may be monitored and/or recorded constantly, periodically, aperiodically, in real-time, and/or as historical data. For example, the characteristics may be monitored, stored, and/or transmitted during a servicing event, reconfiguration event, during vehicle maintenance, and/or in accordance with a user, insurer, or third party request. The characteristic(s) of the autonomous drive mode selection system may be provided to the insurer (or a third party intermediary) via a wireless network, a wired network, and/or by physical transport of media. The characteristic(s) may be transmitted using any of a wide variety of encryption, authentication, and/or digital signing methods. One or more properties of an insurance policy may be based, at least in part, upon one or more characteristics of a vehicle autonomous drive mode selection system.

Characteristics of the autonomous drive mode selection system include, but are not limited to, an indication that: an autonomous driving mode is or has been selected via the autonomous drive mode selection system; the autonomous drive mode selection system is or has been disabled; and/or that the autonomous drive mode selection system is, has been, or can be disabled or overridden. Characteristics of the autonomous drive mode selection system may also include information associated with the usage of various selectable autonomous drive modes and/or licensing, certification, and/or identification of an autonomous drive mode selection system. The characteristics may also comprise configuration, limitations, communication connection strengths, and/or communication capabilities of the autonomous drive mode selection system.

The insurance policy may pertain to any asset or entity including, but not limited to: the vehicle itself, a fleet of vehicles, a remote and/or local operator of the vehicle, a passenger of the vehicle, an owner of the vehicle (or fleet of vehicles), an entity having a security interest in the vehicle (or fleet of vehicles), a remote and/or local robotic operator of the vehicle, the provider of a robotic control system associated with the vehicle, an entity having a relationship with an operator and/or passenger of the vehicle (e.g., an employer of the vehicle operator), or the like. Accordingly, the insurance policy may include, but is not limited to, one or more of: an asset insurance policy (e.g., vehicle insurance policy or robotic controlled insurance policy), a liability insurance policy, a health insurance policy, a life insurance policy, a disability insurance policy, a workers' compensation policy, a group insurance policy, an individual insurance policy, a remote robot insurance policy, a local robot insurance policy, or the like. The teachings of the disclosure are not limited to traditional insurance policies; accordingly, the terms insurance and insurance policies are intended to encompass any risk-transference and/or risk-mitigation mechanism.

The property of the insurance policy may be determined before or after the insurance policy is in effect (e.g., to update or modify the property of the insurance policy). In some embodiments, the property may be dynamically determined and may be based, at least in part, upon the capabilities, configuration, and/or operating state of the autonomous drive mode selection system, the operator, passengers, and/or external conditions (e.g., road conditions, visibility, traffic, etc). Characteristics of an operator and/or a passenger(s) may be dynamically supplied to an insurer and effect a dynamically modified property of an insurance policy. The relationship between the insurance policy property and the characteristics of the autonomous drive mode selection system, operators, and/or passengers may create an incentive for the insured to use the autonomous drive mode selection system.

In some embodiments, one or more characteristics of an autonomous drive mode selection system may be monitored and provided to an insurer. A property of an associated insurance policy may be calculated by the insurer (remotely) and/or locally by the autonomous drive mode selection system. Additionally, potential property(ies) may be calculated for alternative selections, enablement, and disablement of the autonomous drive mode selection system. An operator and/or passenger of the vehicle may be presented with a calculated potential property if the operator or passenger elects to switch from the current autonomous driving mode to another autonomous driving mode. For example, an operator may have the autonomous drive mode selection system disabled and a deductible may be calculated at $500. The autonomous drive mode selection system and/or an insurer may determine that if the operator were to switch to an autonomous driving mode, the deductible would be reduced to $100. The driver may be presented with this information and an option to switch to the autonomous driving mode.

Accordingly, a property of an insurance policy may be dynamically adjusted based on a characteristic of an autonomous drive mode selection system. An operator, or other entity, may receive real-time advice associated with an effect on the property of a selection of an autonomous driving mode selectable via an autonomous drive mode selection system. The operator, or other entity, may receive advice, alerts, and/or instructions regarding a change in a property of an insurance value based on a selected or potential selection of an autonomous driving mode selection. The advice, alert, and/or instructions may include visual alerts, audio alerts, and/or haptic alerts.

The property of the insurance policy may also be determined base, at least partially, on external conditions including, but not limited to, time of day, visibility, lighting conditions, absolute location, a relative location, road conditions, and/or weather conditions. In some situations the property, such as a deductible or premium, may vary based on the combination of the driving mode selected and an external condition. For example, a deductible may be lower using an autonomous driving mode in good weather, but lower using a manual driving mode in bad weather.

Some of the infrastructure that can be used with embodiments disclosed herein is already available, such as: general-purpose computers, RF tags, RF antennas and associated readers, cameras and associated image processing components, microphones and associated audio processing components, computer programming tools and techniques, digital storage media, and communication networks. A computing device may include a processor such as a microprocessor, microcontroller, logic circuitry, or the like. The processor may include a special purpose processing device such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device such as non-volatile memory, static RAM, dynamic RAM, ROM, CD-ROM, disk, tape, magnetic, optical, flash memory, or other machine-readable storage medium.

Various aspects of certain embodiments may be implemented using hardware, software, firmware, or a combination thereof. As used herein, a software module or component may include any type of computer instruction or computer executable code located within or on a machine-readable storage medium. A software module may, for instance, comprise one or more physical or logical blocks of computer instructions, which may be organized as a routine, a program, an object, a component, a data structure, etc. that performs one or more tasks or implements particular abstract data types.

In certain embodiments, a particular software module may comprise disparate instructions stored in different locations of a machine-readable storage medium, which together implement the described functionality of the module. Indeed, a module may comprise a single instruction or many instructions, and may be distributed over several different code segments, among different programs, and across several machine-readable storage media. Some embodiments may be practiced in a distributed computing environment where tasks are performed by a remote processing device linked through a communication network.

In the exemplary embodiments depicted in the drawings, the size, shape, orientation, placement, configuration, and/or other characteristics of tags, computing devices, advertisements, cameras, antennas, microphones, and other aspects of mobile devices are merely illustrative. Specifically, mobile devices, computing devices, tags, and associated electronic components may be manufactured at very small sizes and may not necessarily be as obtrusive as depicted in the drawings. Moreover, image, audio, and RF tags, which may be significantly smaller than illustrated, may be less intrusively placed and/or configured differently from those depicted in the drawings.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1 is a block diagram 100 depicting one embodiment of an exemplary autonomous drive mode selection system 101. The autonomous drive mode selection system 101 may be deployed within a ground vehicle 102, such as a car, truck, bus, or any other type of vehicle. The autonomous drive mode selection system 101 may comprise a sensing system 110, a processing module 120, a communication module 130, a vehicle interface module 140, a storage module 150, and a monitor module 160. The sensing system 110 may be configured to acquire information pertaining to objects within a predetermined range of the vehicle 102. The processing module 120 may use information obtained by the sensing system 110 (and/or other sources) to provide sufficient information to a remote manual operator and/or a robotic operator (remote or local) to control various aspects of the operation of the car (e.g., steering, deceleration, and/or acceleration). The communication module 130 may be used to communicate with a remote robotic controller, a remote manual operator, an insurer, and/or a third party intermediary. The storage module 150 may be used to store information pertaining to the capabilities, configuration, and/or operating state of the autonomous drive mode selection system 101. The monitor module 160 may be configured to monitor characteristics of the autonomous drive mode selection system 101 and to provide the characteristics to an insurer.

The sensing system 110 may be configured to acquire information pertaining to objects, external conditions, and/or other vehicles 103, 104, and 106 that may be useful in robotically or remotely operating the vehicle 102. The sensing system 110 may be further configured to acquire information pertaining to the vehicle 102 itself. The sensing system 110 may be configured to acquire kinematic information. As used herein, kinematics refers to motion characteristics of an object; kinematic information may include, but is not limited to: velocity, acceleration, orientation, and so on. Kinematic information may be expressed using any suitable reference system. Accordingly, kinematic information may be represented as component values, vector quantities, or the like.

The sensing system 110 may comprise one or more active and/or passive sensors, which may include, but are not limited to, one or more electro-magnetic sensing systems (e.g., radar sensing systems, capacitive sensing systems, and the like), electro-optical sensing systems (e.g., laser sensing system, Light Detection and Ranging (LIDAR) systems, and the like), acoustic sensing systems, imaging systems (e.g., cameras, image processing systems, stereoscopic cameras, etc.), information receiving systems (e.g., Global Positioning System (GPS) receiver, wireless network interface, etc.), and so on. The sensing system 110 may further comprise sensors for determining the kinematics of the vehicle 102. Accordingly, the sensing system 110 may comprise one or more speedometers, accelerometers, gyroscopes, or the like. Alternatively, or in addition, the sensing system 110 may comprise (or be communicatively coupled to) a control system 105 of the vehicle 102. As used herein, a vehicle "control system" refers to a system for providing control inputs to the vehicle, such as a steering, a braking (deceleration), acceleration, and so on. The vehicle control system 105 may comprise sensors for determining velocity, acceleration, braking performance (e.g., an anti-lock braking system), and the like. The sensing system 110 may be configured to monitor control system inputs 105 to predict changes to vehicle kinematics useful for remote and/or robotic operation of the vehicle 102 (e.g., predict changes to acceleration based upon operator control of accelerator and/or braking inputs). Although particular examples of sensing systems are provided herein, the disclosure is not limited in this regard and could incorporate any sensing system 110 comprising any type of sensors.

The sensing system 110 may be capable of acquiring information pertaining to objects within a predetermined detection range of the vehicle 102. As used herein, a "detection range" of the sensing system 110 refers to a range at which the sensing system 110 is capable of (and/or configured to) acquiring information. In some embodiments, the detection range may be more limited than the maximum detection range of the sensing system 110 (the maximum range at which the sensing system 110 can reliably acquire information). Moreover, the detection range may be different for different types of sensors in sensing system 110. The detection range may be set by user configuration and/or may be determined automatically based upon operating conditions of the vehicle 102, such as vehicle velocity and/or direction, velocity of other objects, weather conditions, and so on.

In some embodiments, the sensing system 110 may comprise directional sensors (e.g., a beam forming radar, phased array, or the like). The autonomous drive mode selection system 101 may shape and/or direct the detection range of the sensing system 110 in response to operating conditions. For example, when the vehicle 102 is travelling forward at a high velocity, the detection range may be directed toward the front of the vehicle 102; when the vehicle 102 is turning, the detection range may be steered in the direction of the turn; and so on.

The autonomous drive mode selection system 101 may communicate with one or more insurers, remote robotic systems, and/or remote manual operators using the communication module 130. The communication module 130 may include, but is not limited to, one or more: wireless network interfaces, cellular data interfaces, satellite communication interfaces, electro-optical network interfaces (e.g., infrared communication interfaces), wired network interfaces, and/or facilitate physical transport of storage media, and the like. The autonomous drive mode selection system 101 may configure the sensing system 110 based on communication received via communication module 130. For instance, communication module 130 may facilitate software and/or firmware updates to autonomous drive mode selection system 101.

The autonomous drive mode selection system 101 may be further configured to provide information to and receive information from other autonomous drive mode selection systems (e.g., an autonomous drive mode selection system of vehicles 103, 104, and/or 106). Providing this information may comprise configuring the sensing system 110 in cooperation with the other vehicles. For example, the sensing system 110 may be capable of obtaining reliable, accurate information pertaining to objects in a particular area 116, but may not be capable of reliably obtaining information pertaining to objects in other areas (e.g., area 114). The autonomous drive mode selection system 101 may coordinate with other vehicles to provide those vehicles with information pertaining to objects in area 116. In exchange, the other vehicles may provide the autonomous drive mode selection system 101 with information pertaining to objects in other areas, such as area 114. This coordination may comprise the autonomous drive mode selection system 101 configuring the detection range 112 of the sensing system 110 (e.g., by beam forming, steering, or the like) to acquire information pertaining to area 116 to the exclusion of other areas that will be provided by the other vehicles.

The autonomous drive mode selection system 101 may further comprise a processing module 120, which may use the information acquired by the sensing system 110 (and/or obtained from other sources via the communication module 130) to facilitate robotic and/or remote operation of the vehicle 102. The processing module 120 may comprise one or more processors, including, but not limited to: a general-purpose microprocessor, a microcontroller, logic circuitry, an ASIC, an FPGA, PAL, PLD, PLA, and the like. The processing module 120 may further comprise volatile memory, persistent, machine-readable storage media 152, and the like. The persistent machine-readable storage media 152 may comprise instructions configured to cause the processing module to configure the sensing system 110, coordinate with other autonomous drive mode selection systems, facilitate local robotically controlled operation, remote robotically-controlled operation, and remote manually-controlled operation, and so on, as described herein.

The autonomous drive mode selection system 101 may comprise and/or be communicatively coupled to human-machine interface components 107 of the vehicle 102. The human-machine interface components 107 may include, but are not limited to: visual display components (e.g., display screens, heads-up displays, or the like), audio components (e.g., a vehicle audio system, speakers, a horn, or the like), haptic components (e.g., power steering controls, force feedback systems, or the like), and so on.

In some embodiments, the autonomous drive mode selection system 101 may use the human-machine interface components 107 to alert an operator of the vehicle 102 as to the potential effects on a property of an insurance policy of the selection of an autonomous driving mode, or disablement thereof. The alert may comprise one or more of: an audible alert (e.g., alarm), a visual alert, a haptic alert, or the like. Although particular examples of human-machine interface components 107 are described herein, the disclosure is not limited in this regard and could be adapted to incorporate any suitable human-machine interface components 107, including those adapted to accommodate various disabilities.

The autonomous drive mode selection system 101 may be configured such that a selection made via the autonomous drive mode selection system 101 cannot be overridden by the vehicle operator. Accordingly, the autonomous drive mode selection system 101 may be configured to "lock out" the vehicle operator from portions of the control system 105. Access to the vehicle control system 105 may be restored by making a new selection and/or disabling the autonomous drive mode selection system 101. The autonomous drive mode selection system 101 may be configured to "lock out" the vehicle operator from all vehicle control operations. Alternatively, the vehicle operator may be allowed limited access to the control system 105. For example, the control system 105 may accept operator inputs such as braking (e.g., in emergency situations).

Alternatively, the autonomous drive mode selection system 101 may be configured to allow the vehicle operator to override a selected autonomous driving mode. For example, the local operator may be able to override the decisions of a local robotically-controlled system, a remote robotically-controlled system, and/or a remote manually-controlled system. In response to an override, the autonomous drive mode selection system 101 may automatically disable the autonomous drive mode selection system 101, thereby reverting to a local manually-controlled system (e.g., a traditional driving experience where the driver controls the steering wheel, brake pedal, and gas pedal). An override may comprise the vehicle operator providing an input to the control system 105 (or other human-machine interface component 107).

The autonomous drive mode selection system 101 may further comprise a storage module 150 that is configured to store information pertaining to the capabilities, configuration, and/or operating state of the autonomous drive mode selection system 101 (and/or vehicle 102). The storage module 150 may comprise persistent storage media 152, such as hard disks, solid-state storage, optical storage media, or the like. Alternatively, or in addition, the storage module 150 may be configured to store data in a network-accessible storage service 134, such as a cloud storage service or the like (via the communication module 130).

The storage module 150 may be configured to store any information pertaining to the vehicle 102, which may include, but is not limited to: kinematics of the vehicle 102, operator control inputs (e.g., steering, braking, etc.), autonomous driving mode selections made via the autonomous drive mode selection system 101, other characteristics of the autonomous drive mode selection system 101, characteristics of the local operator, characteristics of one or more passengers, external conditions, and/or other information associated with the vehicle 102. Accordingly, the storage module 150 may act as a "black box" detailing the operating conditions of the vehicle 102 and/or characteristics of the autonomous drive mode selection system 101.

The storage module 150 may be configured to prevent unauthorized access to and/or modification of stored information. Accordingly, the storage module 150 may be configured to encrypt information for storage. The storage module 150 may also provide for validating authenticity of stored information; for example, the storage module 150 may be configured to cryptographically sign stored information. The communication module 130 may be configured to periodically upload the contents of storage module 150 to an insurer or other entity.

The monitor module 160 may be configured to monitor characteristics of the autonomous drive mode selection system 101 including, but not limited to: capabilities of the autonomous drive mode selection system 101, the configuration of the autonomous drive mode selection system 101, and/or the operating state of the autonomous drive mode selection system 101 and/or vehicle 102. The monitor module 160 may be further configured to provide the characteristics to an insurer. Providing the characteristics may comprise storing the characteristics using the storage module 150 (e.g., storing the characteristics on the persistent, machine-readable storage medium 152), transmitting the characteristics to the insurer via the network 132, transmitting the characteristics to the network-accessible storage device 134, or the like. The monitor module 160 may be further configured to sign the characteristics, encrypt the characteristics, and/or provide an authentication credential with the characteristics.

The characteristics of the autonomous drive mode selection system 101 described above may be embodied within a data structure, which may be stored on a machine-readable storage medium (e.g., storage medium 152) and/or conveyed on a communication network (e.g., network 132). An insurer (or other entity) may determine one or more properties of an insurance policy based upon the contents of the data structure. The information may be transmitted to a third party intermediary and then forwarded to an insurer or other entity.

The autonomous drive mode selection system 101 may be configured to function with any number of autonomous and/or automated driving systems. The autonomous driving modes may be relatively complex providing for the full operation of a vehicle, or may provide relatively minor automated driving features. For example, the autonomous drive mode selection system 101 may allow for the enablement or disablement of an automated parking assist feature. In such an embodiment, the autonomous drive mode selection system 101 may indicate to an insurer whether or not an operator uses the automated parking assist feature, or not. The insurer may provide a financial incentive to enable (or disable) the automated parking assist feature. In some embodiments, the autonomous drive mode selection system 101 may provide real-time advice with respect to the effects of enabling (or disabling) the automated parking assist feature may have on a property of an insurance policy.

In more complex embodiments, the autonomous drive mode selection system 101 may provide various permutations of remote, local, robotic, manual, semi-robotic control systems. In such an embodiment, the autonomous drive mode selection system 101 may indicate to an insurer whether or not an operator enables the autonomous drive mode selection system 101 and/or which automated driving mode(s) are used by the operator. The insurer may provide a financial incentive to enable (or disable) the autonomous drive mode selection system 101. Moreover, the insurer may provide a financial incentive to select a particular autonomous driving mode via the autonomous drive mode selection system 101. Again, the autonomous drive mode selection system 101 may provide real-time advice with respect to the effects a selection of a particular autonomous driving mode may have on a property of an insurance policy.

Figure 2A:
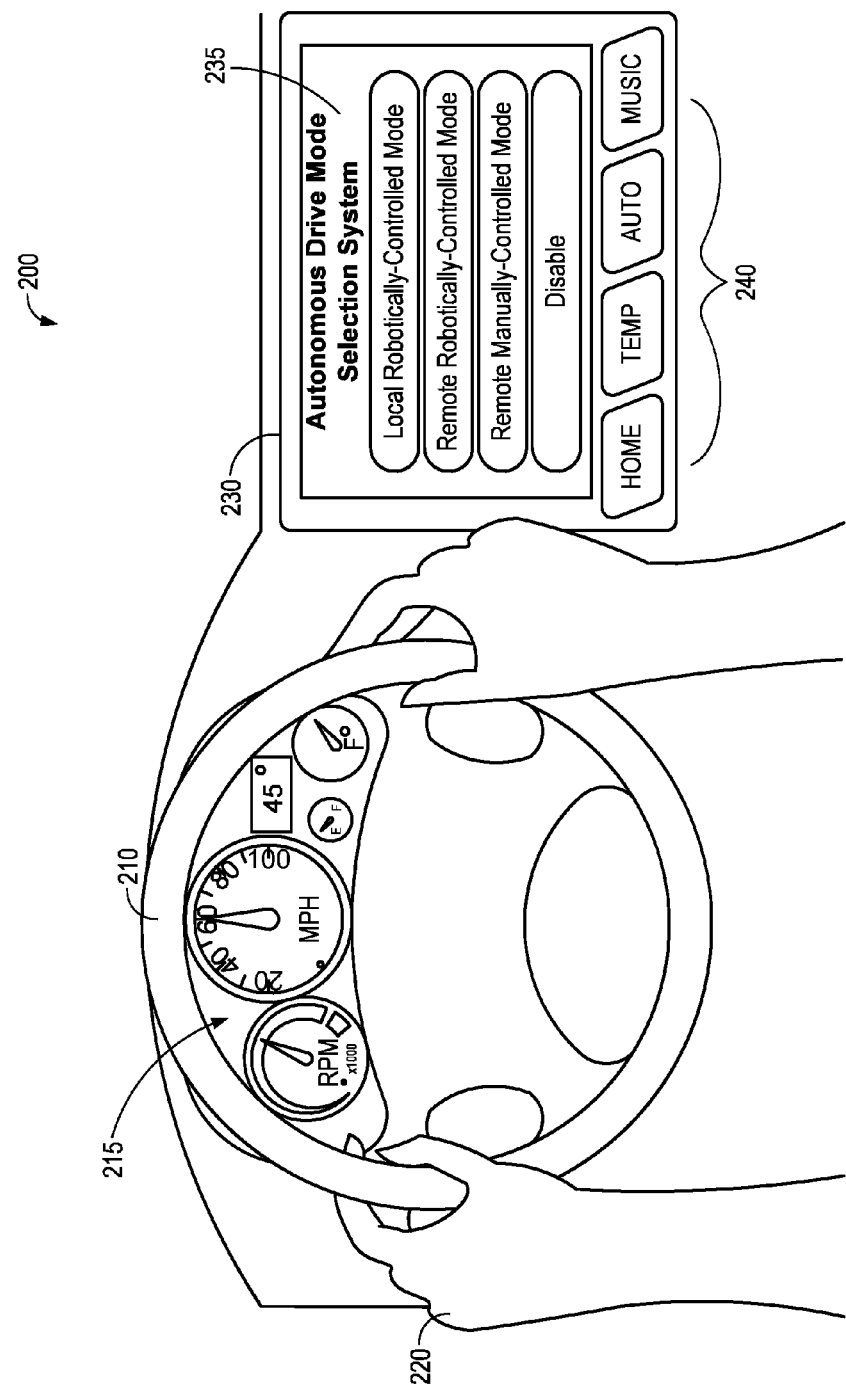
FIG. 2A illustrates an operator's view of an interior of a vehicle, including a steering wheel and an embodiment of an autonomous drive mode selection system.

FIG. 2A illustrates an operator's view of an interior of a vehicle 200, including a steering wheel (a human-machine interface component) 210. An operator 220 may view operational information on a dashboard 215, such as tachometer information, speed information, engine temperature, and fuel levels. In addition, an interactive display 230 may provide various functions 240, such as navigation control, temperature control, music, and access to an autonomous drive mode selection system 235. In the illustrated embodiment, the operator 220 may select between various autonomous driving modes via the autonomous drive mode selection system 235. Specifically, the operator 220 may select a local robotically-controlled mode, a remote robotically-controlled mode, and a remote manually-controlled mode. The operator may also disable the autonomous drive mode selection system 235, reverting back to a local manually controlled mode.

The local robotically-controlled mode may allow an automated system primarily stored within the vehicle 200 to operate the vehicle. The locally-stored automated system may control all aspects of the vehicle's operation, including steering, braking, and acceleration. Alternatively, the locally-stored automated system may have limited control of one or more aspects of the vehicle's operation and/or only have control in predetermined instances, locations, during predetermined events, and/or when allowed by the operator 220. The remote robotically-controlled mode may be similar to the local robotically-controlled mode, except that the automated system may be primarily stored remotely from vehicle 200. In such embodiments, a communication module may be configured to receive data from the autonomous drive mode selection system 235 in real-time. The remote manually-controlled mode may allow a human operator 220 in a remote location to operate the vehicle 200, monitor the operation of the vehicle 200, selectively operate the vehicle 200. The remote operator of the vehicle 200 may have full or limited control of the vehicle 200.

Figure 2B:
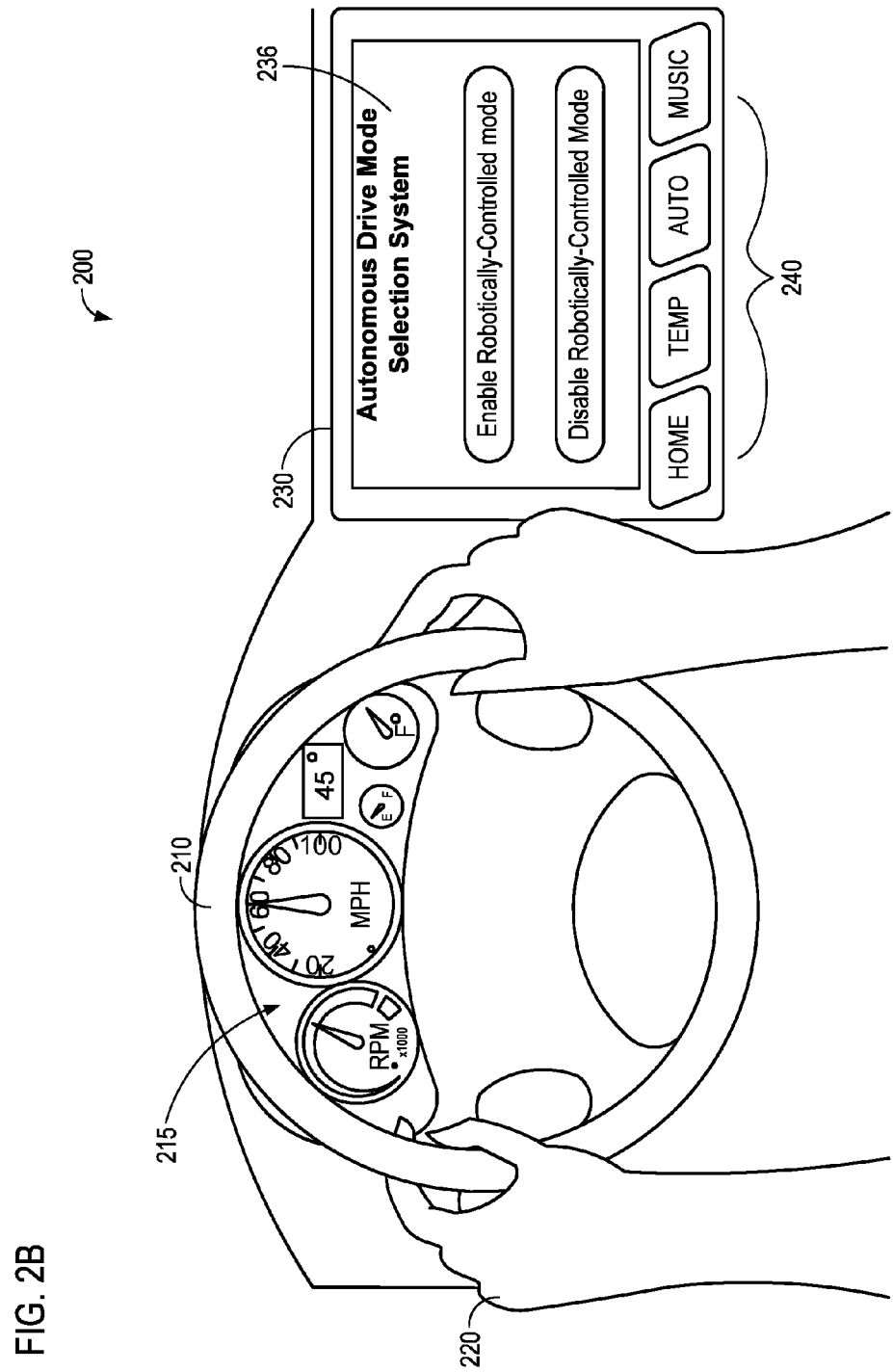
FIG. 2B illustrates an operator's view of an interior of a vehicle, including another embodiment of an autonomous drive mode selection system.

FIG. 2B illustrates an operator's view of an interior of a vehicle 200, including another embodiment of an autonomous drive mode selection system 236. In the illustrated embodiment, the autonomous drive mode selection system 236, displayed on interactive display 230, includes only an option to enable a robotically-controlled mode or disable a robotically-controlled mode. Effectively, the autonomous drive mode selection system 236 may either be enabled or disabled. Similar to previously described embodiments, a robotically-controlled mode may include a locally- or remotely-stored automated system configured to control various aspects of the vehicle's operation, including steering, braking, and acceleration.

Figure 2C:
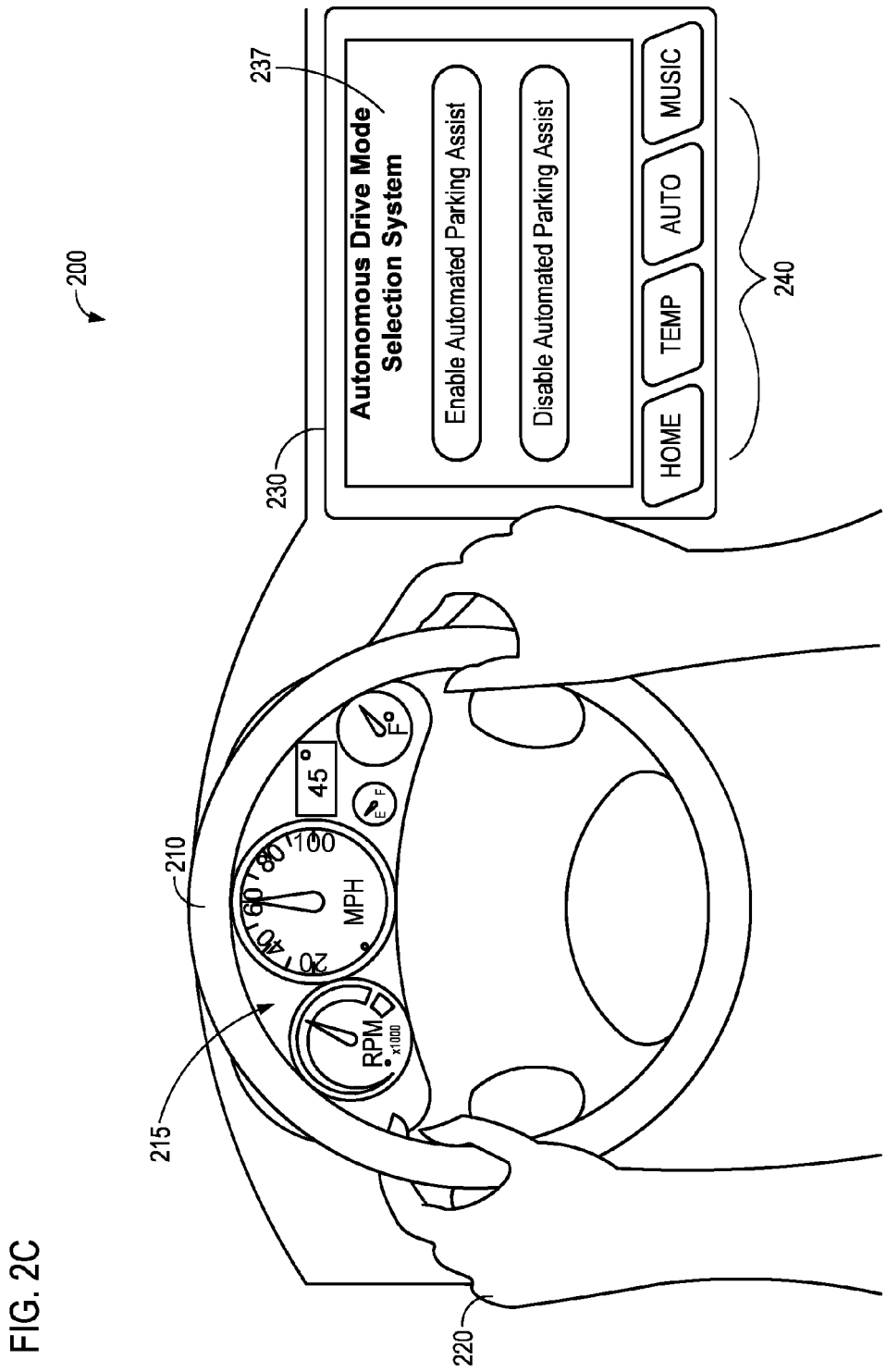
FIG. 2C illustrates an operator's view of an interior of a vehicle, including a third embodiment of another autonomous drive mode selection system.

FIG. 2C illustrates an operator's view of an interior of a vehicle 200, including a third embodiment of another autonomous drive mode selection system 237. In the illustrated embodiment, the autonomous drive mode selection system 237 may include relatively limited autonomous driving modes. For example, the autonomous drive mode selection system 237 may simply allow an automated parking assist feature to be enabled or disabled. According to such an embodiment, the autonomous drive mode selection system 237 may indicate to an insurer whether or not the automated parking assist feature is enabled or disabled (i.e. the characteristic provided to the insurer may provide an indication that the autonomous drive mode selection system 237 is either enabled or disabled).

Figure 3:
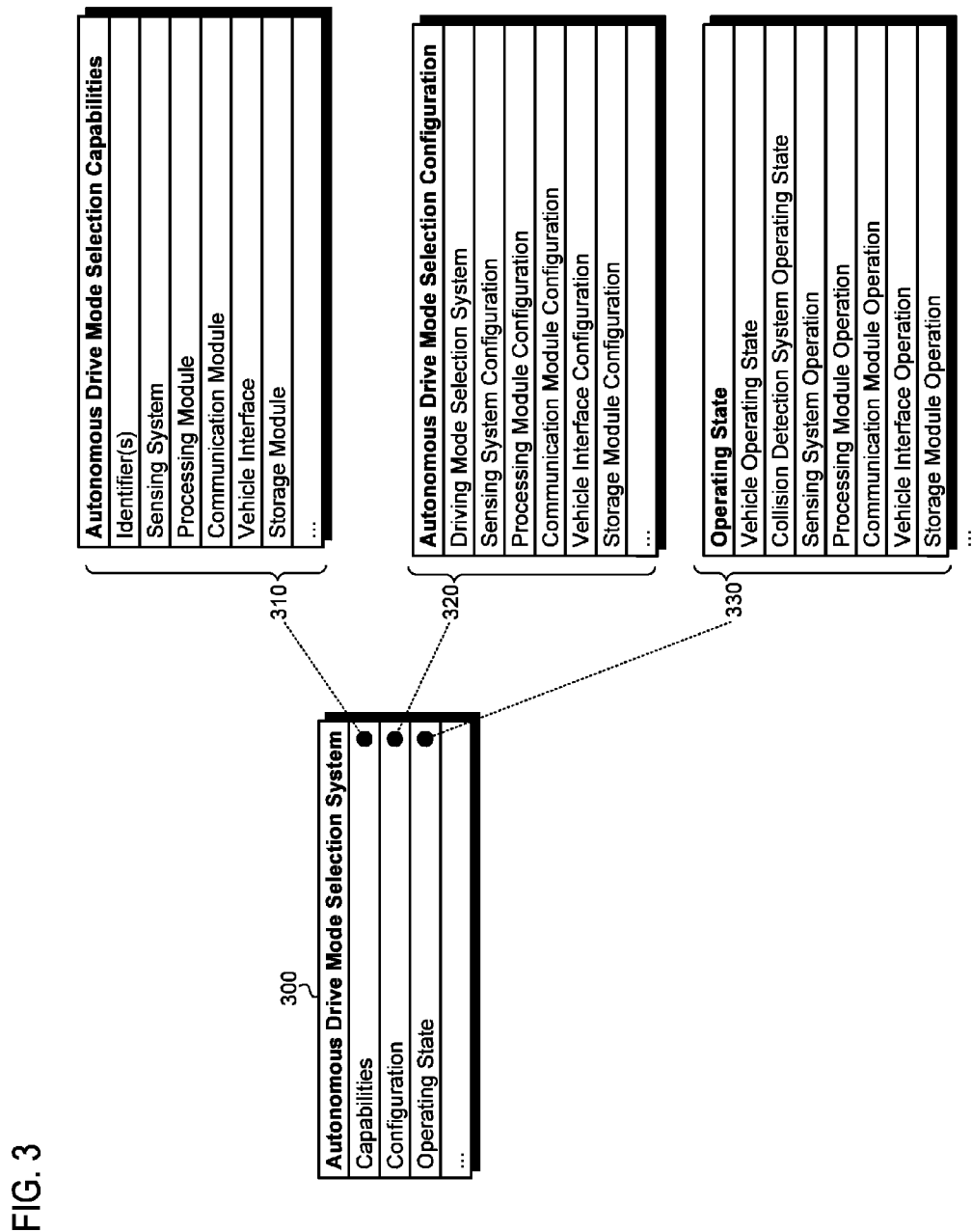
FIG. 3 depicts one embodiment of a data structure comprising autonomous drive mode selection system characteristics.

FIG. 3 depicts one embodiment of a data structure 300 comprising characteristics of an autonomous drive mode selection system, which may include, but are not limited to: data 310 pertaining to the capabilities of the autonomous drive mode selection system, data 320 pertaining to the configuration of the autonomous drive mode selection system, data 330 pertaining to the operating state of the autonomous drive mode selection system and/or vehicle, and so on.

The data 310 may specify the capabilities of the autonomous drive mode selection system. The data 310 may include information from which capabilities may be determined, such as an identifier (e.g., name and/or model number) of the autonomous drive mode selection system, certifications of the autonomous drive mode selection system, and so on. The data 310 may comprise information pertaining to particular modules and/or systems of the autonomous drive mode selection system, such as the capabilities of the sensing system, processing module, communication module, vehicle interface module, and/or storage module, described in conjunction with FIG. 1. The data 310 pertaining to the sensing system may specify the sensors available to the autonomous drive mode selection system, the detection range of the sensing system, accuracy of the sensing system, and so on. The data 310 pertaining to the processing module may specify the processing resources available to the autonomous drive mode selection system.

Data 310 pertaining to the communication module may include the connection strengths, capabilities, encryption(s) used, digital signing abilities, etc. Data 310 pertaining to the vehicle interface module include information about which types of autonomous driving modes are available via the autonomous drive mode selection system. In addition, data 310 pertaining to the vehicle interface module may include information indicating the ability of the autonomous drive mode selection system to notify and/or advise the operator of the vehicle with respect to changes (or potential changes) in a property of an insurance policy based on a selection of an autonomous driving mode. Data 310 pertaining to the storage module may indicate whether the autonomous drive mode selection system is capable of storing data pertaining to the operating state of the system and/or vehicle, security measures of the storage system, storage capacity, and so on.

The data 320 may describe the configuration of the autonomous drive mode selection system. The data 320 may indicate how the autonomous drive mode selection system is configured to use the capabilities identified in the data 310. The data 320 may comprise a current configuration of the autonomous drive mode selection system. For example, the data 320 may indicate whether or not an autonomous drive mode selection system is enabled or disabled. The data 320 may indicate which of one or more autonomous driving modes is currently selected via an autonomous drive mode selection system. The data 320 may comprise static configuration data (e.g., configuration information that cannot be changed or can be changed only under certain circumstances), a history (e.g., time-based data or log describing the configuration of the autonomous drive mode selection system over time), or the like.

The data 320 may further comprise configuration information of individual systems and/or modules of the autonomous drive mode selection system. Configuration data 320 pertaining to the sensing system may specify which sensors are enabled, calibration information pertaining to the sensors, and so on. Configuration data 320 pertaining to the communication module may specify what communication the autonomous drive mode selection system is capable of transmitting between the vehicle, operator, insurer, and/or third party intermediary. The data 320 may further specify whether the autonomous drive mode selection system can be or has been overridden by the vehicle operator. Data 320 pertaining to the storage module may specify whether the autonomous drive mode selection system is configured to persistently store (and/or communicate) information pertaining to the operation of the vehicle and/or the autonomous drive mode selection system, and so on. In addition, data 320 may pertain to the autonomous drive mode selection system's ability to detect, record, and/or transmit information associated with one or more external conditions.

Figure 4:
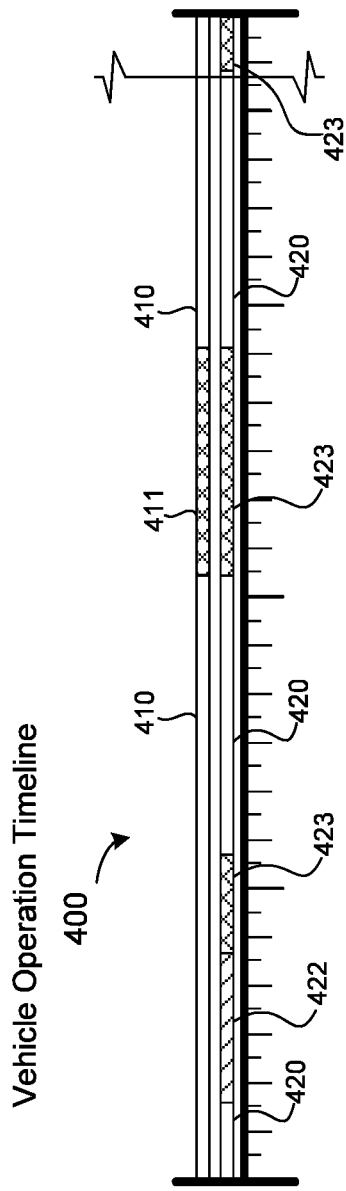
FIG. 4 depicts one embodiment of a history of autonomous drive mode selection system characteristics.

As discussed above, the data structure 300 may comprise a history (e.g., time-based record or log) pertaining to the autonomous drive mode selection system and/or the vehicle 102. FIG. 4 depicts one example of a history pertaining to the configuration of an autonomous drive mode selection system. The data illustrated in FIG. 4 could be included in the data structure 300 (or other suitable data structure) for use in determining one or more properties of an insurance policy, as described herein. The data depicted in FIG. 4 relates to a vehicle operation timeline 400. The timeline 400 may be contiguous (e.g., an "absolute" timeline). Alternatively, the timeline 400 may be discontiguous and include only the time during which the vehicle is in operation (e.g., the vehicle is on or in motion), the autonomous drive mode selection system is enabled, and/or a particular autonomous driving mode is selected via the autonomous drive mode selection system. In another example, the timeline 400 may be used to identify the operating state, such as the selected autonomous driving mode, of the autonomous drive mode selection system (and/or vehicle 102) at the time of a particular event.

In the illustrated embodiment, the time regions 410 identify the time during which the autonomous drive mode selection system is enabled (e.g., a particular autonomous driving mode is selected). In some embodiments, unique time regions or identifiers may be used to mark each of a plurality of selectable autonomous driving modes. The time regions 411 indicate the time during which the autonomous drive mode selection system was inactive (e.g., not enabled). The history of FIG. 4 may further comprise data pertaining to the configuration of particular systems and/or modules of the autonomous drive mode selection system. For example, the time regions 420 may identify the time during which a remote or local robotically-controlled autonomous driving mode was selected. The time region 422 may identify the time during which a remote manually-controlled autonomous driving mode was selected. Time regions 423 may identify the times during which an operator was advised or notified regarding a (potential) change in a property of an insurance policy based on a (potential) selection of an autonomous driving mode. Although the history of FIG. 4 depicts examples of particular characteristics, the disclosure is not limited in this regard, and the data structure 300 (or other suitable data structures) could be adapted to incorporate history data pertaining to any capability, configuration, and/or operating state of the autonomous drive mode selection system, the vehicle, the operator(s), the passenger(s), and/or external conditions.

In some embodiments, data pertaining to the autonomous drive mode selection system may be provided as a ratio or comparison. For example, the data structure 320 may include a value that compares the operation time during which the autonomous drive mode selection system was enabled versus the time during which the autonomous drive mode selection system was disabled. The comparison value may be derived from the history of FIG. 4. In some embodiments, comparison values may be used in place of, or in addition to, time-based data or logs (e.g., histories) in the data structure 300.

Referring back to FIG. 3, in some embodiments the data structure 300 may comprise information pertaining to the operating state of the autonomous drive mode selection system, the vehicle, the operator(s), the passenger(s), and/or external conditions. As discussed above, the operating state of the autonomous drive mode selection system may refer to a current configuration of the autonomous drive mode selection system and/or the configuration (and use) of the autonomous drive mode selection system at a particular time. For example, the operating state may include information about the weather and/or information about the autonomous driving mode selected via the autonomous drive mode selection system. The data 330 may further comprise operational data pertaining to various systems and/or modules of the autonomous drive mode selection system, such as the sensing system, processing module, communication module, vehicle interface, storage module, and so on.

The operating state data 330 may further comprise information pertaining to the operation of the vehicle (vehicle operating state), which may include, but is not limited to: kinematics of the vehicle, operator inputs, operator overrides, operating conditions (e.g., weather, vehicle diagnostics, etc.), vehicle position (e.g., GPS position), and so on. The operating state data 330 comprise kinematic data pertaining to other objects (e.g., vehicles 103 and/or 104 in FIG. 1), the collision detection model of the autonomous drive mode selection system, a record of communication and/or coordination with other vehicles, insurers, remote manual operators, remote robotic operators, and so on. An insurance policy property may be determined and/or adjusted in real-time, on period basis, at random intervals, monthly, yearly, etc. The insurance policy property may be determined and/or adjusted, at least in part, based upon the operating state data and/or other data (e.g., data 310, 320, and/or 330).

As discussed above, an insurer may use characteristics of an autonomous drive mode selection system (e.g., the data structure 300) to determine a property of an insurance policy.

The property of the insurance policy may be determined before the insurance policy is in effect (e.g., before the insurer and the insured enter into the contract defined by the insurance policy). Once the properties of the insurance policy are determined, the insurer and insured may enter into the insurance policy (e.g., formalize the insurance policy), which may cause the insurance policy to go into effect. Alternatively, or in addition, the property may be determined (or adjusted) after the insurance policy is in effect. Accordingly, one or more properties of the insurance policy may be dynamic, and may change in response to changes to the characteristics of the autonomous drive mode selection system.

Figure 5:
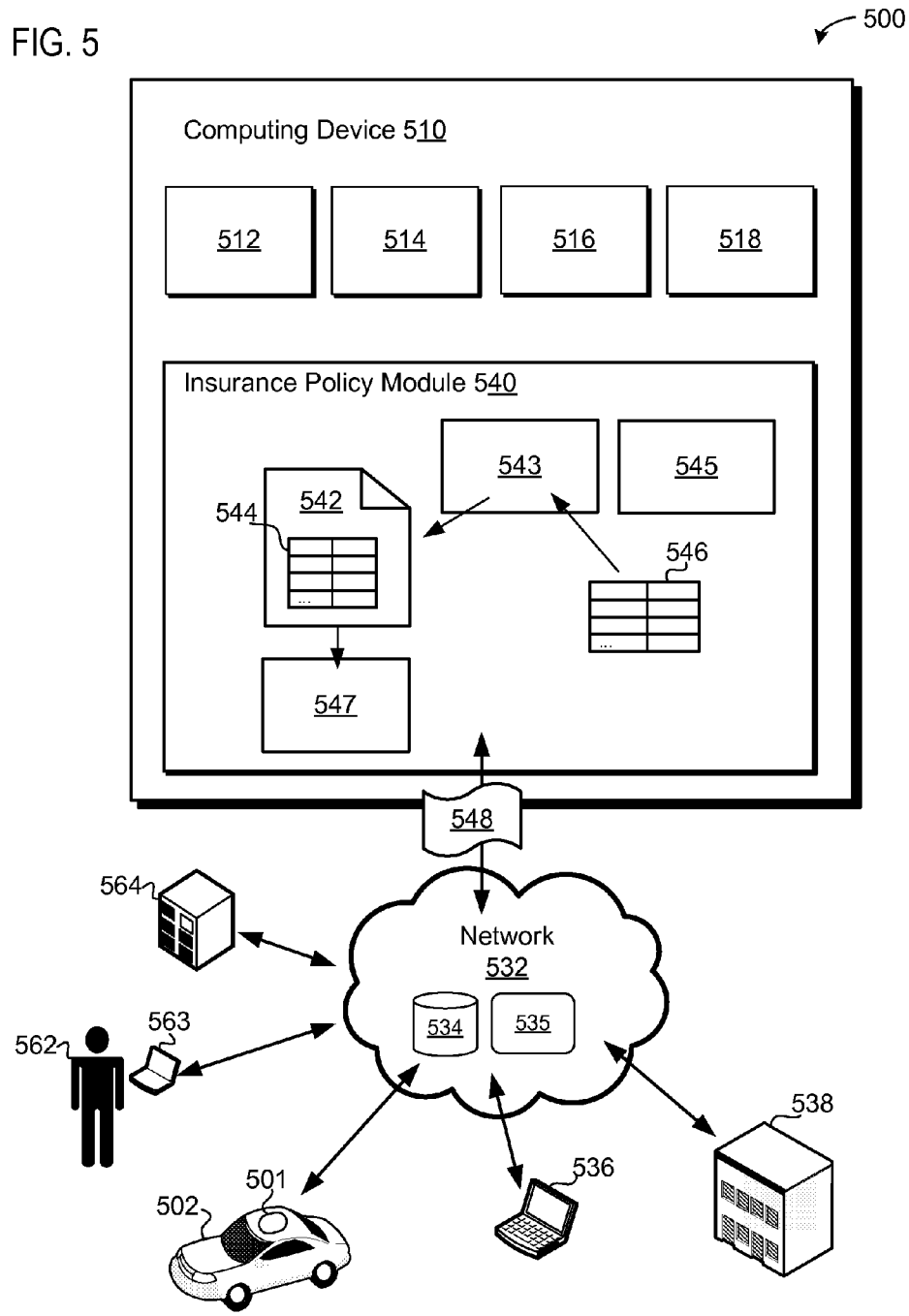
FIG. 5 is a block diagram of one embodiment of a system for determining a property of an insurance policy based, at least in part, on a characteristic of an autonomous drive mode selection system.

FIG. 5 is a block diagram of one embodiment of a system 500 for determining one or more properties of an insurance policy based upon characteristics of an autonomous drive mode selection system 501 in a vehicle 502. The system 500 may comprise a computing device 510, which may comprise a processor 512, a memory 514, a communication interface 516, and persistent storage 518.

An insurance policy module 540 may operate on the computing device 510. The insurance policy module 540 may be embodied as one or more machine-readable instructions stored on a persistent storage media (e.g., storage media 518) and/or transmitted via a communication network (e.g., network 532). The instructions comprising the insurance policy module 540 may be configured for execution on the computing device 510 (e.g., on the processor 512 of the computing device 510). Alternatively, or in addition, portions of the insurance policy module 540 (as well as the other modules and systems disclosed herein) may be implemented using machine elements, such as processors, ASICs, FPGAs, PALs, PLDs, PLAs, or the like.

The insurance policy module 540 may be configured to determine one or more properties 544 of an insurance policy (insurance policy data structure 542) based upon characteristics 546 of an autonomous drive mode selection system 501 (e.g., the autonomous drive mode selection system, described above).

The insurance policy data structure 542 may comprise one or more data structures stored on a machine-readable storage medium, such as the persistent storage 518. Alternatively, or in addition, portions of the insurance policy data structure 542 (and/or the properties 544 thereof) may be transmitted and/or communicated on the communication network 532 (e.g., may be stored in a network-accessible persistent storage service 534). The insurance policy data structure 542 may be implemented using any mechanism for representing information including, but not limited to: text (e.g., ASCII text), a database (e.g., as one or more database tables, records, attributes, or the like), markup language (e.g., HTML, XML, delimited text, etc.), or the like. Accordingly, the properties 544 of the insurance policy data structure 542 may comprise one or more text values, name-value pairs, database elements (e.g., tables, attributes, etc.), XML elements, XML attributes, or the like.

As discussed above, the properties 544 may relate to any aspect of an insurance policy, including but not limited to: eligibility for coverage under the insurance policy, a premium of the insurance policy, a coverage amount of the insurance policy, a deductible of the insurance policy, a rider of the insurance policy, a limitation of the insurance policy, a coverage scope of the insurance policy, the coverage of a particular incident under the insurance policy, or the like.

One or more of the properties 544 may be determined by (e.g., based upon) characteristics 546 of an autonomous drive mode selection system 501. The autonomous drive mode selection system characteristics 546 may be represented in a data structure, which may correspond to the data structure 300 described in conjunction with FIG. 3. The insurance policy module 540 may access the characteristics 546 from a monitor module described above, and/or any suitable data source, which may include, but is not limited to: the persistent storage medium 518, the vehicle (e.g., transmitted directly from the vehicle 502 via the autonomous drive mode selection system 501 or other communication interface); a network-accessible storage service 534; a computing device 536 comprising information pertaining to the autonomous drive mode selection system 501 (e.g., a manufacturer database, vehicle service center, or the like); another entity 538, such as an insurance agency, insurer, or the like; or any other suitable source of information pertaining to the autonomous drive mode selection system 501 and/or the vehicle 502.

The insurance policy module 540 may determine the properties 544 of the insurance policy data structure 542 using any suitable decision-making mechanism, including, but not limited to: lookup tables, a policy, rules 543, an expert system, a neural network, a machine-learning algorithm, or the like. In some embodiments, the insurance policy module 540 is configured to apply one or more rules 543 to determine properties 544 of the insurance policy data structure 542. For example, one of the rules 543 may specify that a property 544 corresponding to the premium of the insurance policy (e.g., cost of the insurance policy) is reduced by a particular amount (or percentage) in response to a characteristic 546 that indicates that the autonomous drive mode selection system 501 is enabled and/or a particular autonomous driving mode is selected. Another one of the rules 543 may specify that the premium property 544 is adjusted based on external characteristics (e.g., whether, visibility, etc) and/or characteristics of the operator and/or vehicle 502. Accordingly, the insurer may promote a particular use of the autonomous drive mode selection system 501 by creating rules 543 that provide incentives for the vehicle operator to make autonomous driving mode selections via the autonomous drive mode selection system 501 in accordance with the insurer's desires.

In some embodiments, the insurance policy module 540 comprises a security module 545 that is configured to authenticate and/or verify the characteristics 546. The security module 545 may verify that the characteristics 546 originated from an authorized source (e.g., the autonomous drive mode selection system 501 itself, authorized personnel, or the like), have not be tampered with (e.g., not modified from their original values), and so on. In some embodiments, the characteristics 546 may comprise a digital signature (or other security mechanism) that can be used to verify the characteristics 546. Alternatively, or in addition, the characteristics 546 may be transmitted to the insurance policy module 540 via a secure communication mechanism, such as mutually authenticated secure sockets layer (SSL) connection, or the like. The security module 545 may leverage the secure communication mechanism to verify the characteristics 546.

The insurance policy module 540 may be configured to determine the properties 544 of the insurance policy data structure 542 before the insurance policy is in effect (e.g., before the insurer and insured enter into the insurance policy). In some embodiments, the insurance policy module 540 comprises a formalization module 547 that is configured to facilitate formalization of the insurance policy. As used herein, formalization refers to the insurer and the insured entering into an insurance policy contract as defined by the insurance policy data structure 542 and/or the properties 544 thereof. Accordingly, the formalization module 547 may be configured to provide the insurance policy data structure 542 (and/or a document 548 corresponding to the to the data structure 542) to an authorized entity 562 of the insured and/or an authorized entity 564 of the insurer, and receive acceptance therefrom. The authorized entity of the insured 562 and/or insurer 564 may be a person, an automated agent (e.g., computing device), or the like. An authorized entity 562 and/or 564 that is a person may interact with the insurance policy module 540 (and/or formalization module 547) via a computing device 563 (e.g., a laptop, notebook, tablet, smart phone, personal digital assistant, or the like).

The formalization module 547 may be configured to authenticate the identity of the authorized entities 562 and/or 564 and/or verify that the entities 562 and/or 564 are authorized to enter into an insurance policy contract on behalf of the insured and/or insurer. The formalization module 547 may authenticate and/or authorize the entities 562 and/or 564 using a digital signature, password, or other credential. In some embodiments, the formalization module 547 may be configured to authenticate and/or authorize the entities 562 and/or 564 using a network-accessible service 535, which may include, but is not limited to: a certificate authority (e.g., an X.509 certificate authority), an authentication authority, an identity service (e.g., a Security Assertion Markup Language (SAML) authentication authority, a Liberty Alliance Authenticating Authority, an Open ID® provider, a Microsoft Passport® service, a Microsoft Cardspace® service, etc.), or the like.

The formalization module 547 may be configured to provide the insurance policy data structure 542 to the authorized entities 562 and/or 564 via the network 532. In some embodiments, the formalization module 547 may be configured to convert the insurance policy data structure 542 into a different format (e.g., different data format, data encoding, or the like). Alternatively, or in addition, the formalization module 547 may be configured to provide the entities 562 and/or 564 with the insurance policy data structure 542 in a human-readable format, such as a document 548. The document 548 may comprise an insurance contract that incorporates the properties 544 of the insurance policy data structure 542. The document 548 may be provided to the entities 562 and/or 564 via the network 532 as a web page, email, fax, or the like. The document 548 may be configured for display on a computing device 563. Accordingly, the formalization module 547 may comprise (and/or be communicatively coupled to) a web server, email server, or the like. Alternatively, or in addition, the formalization module 547 may be configured to provide the entities 562 and/or 564 with a tangible document representing the insurance policy data structure 542 (e.g., a paper copy of an insurance policy).

The formalization module 547 may be further configured to request acceptance of an insurance policy contract in accordance with the insurance policy data structure 542. For example, the document 548 (e.g., insurance policy contract) may include a signature line (or signature input interface) that may receive a signature (or other indication of acceptance) from the authorized entities 562 and/or 564. The signature may comprise any suitable indication of acceptance, including, but not limited to: selection of an interface element (e.g., selecting a checkbox or other interface element of the document 548), a digital signature, a cryptographic signature, or the like. Alternatively, or in addition, the formalization module 547 may request acceptance via in a tangible document (e.g., paper document).

The formalization module 547 may be configured to receive indications of acceptance from the authorized entities 562 and/or 564. The indications may be received via the network 532, as described above. Alternatively, or in addition, acceptance may be received via a signature on a tangible document or the like. In response to receiving acceptance from the authorized entities 562 and 564, the formalization module 547 may update the insurance data structure 542. Updating may comprise indicating that the insurance policy data structure 542 is in effect (or is to go into effect at a particular time and/or under particular circumstances). The updated insurance policy data structure 542 may be stored in a persistent storage medium (e.g., persistent storage medium 518), transmitted via the network 532 (e.g., transmitted to the insured 562 and/or insurer 564), or the like, as described above. The formalization module 547 may be further configured to transmit confirmation of the insurance policy to the authorized entities 562 and/or 564.

In some embodiments, the formalization module 547 may indicate how the properties 544 of the insurance policy data structure 542 were determined. This information may allow the insured to reconfigure the autonomous drive mode selection system 501 to obtain favorable terms. Similarly, as discussed above, the insurer may provide advice and/or instructions on what settings, configurations, and/or selections made via the autonomous drive mode selection system 501 will provide the best terms. For example, the formalization module 547 may indicate that the premium of the policy was determined based, at least in part, on which autonomous driving modes are selected via the autonomous drive mode selection system 501. In response, the authorized entity 562 and/or the operator may reconfigure and/or make alternative driving mode selections via the autonomous drive mode selection system 501 and resubmit the characteristics 546, which may result in a revised set of properties 544 (e.g., lowered premium). The information pertaining to the relationship between insurance policy properties 544 and autonomous drive mode selection system characteristics 546 may be presented in the document 548. The document 548 may be digitally displayed within the vehicle and/or to remote operators. The above authentication, verification, and formalization may occur in real-time, such that an operator may make driving mode selections in real-time in order to dynamically adjust a property of an insurance policy.

Figure 6A:
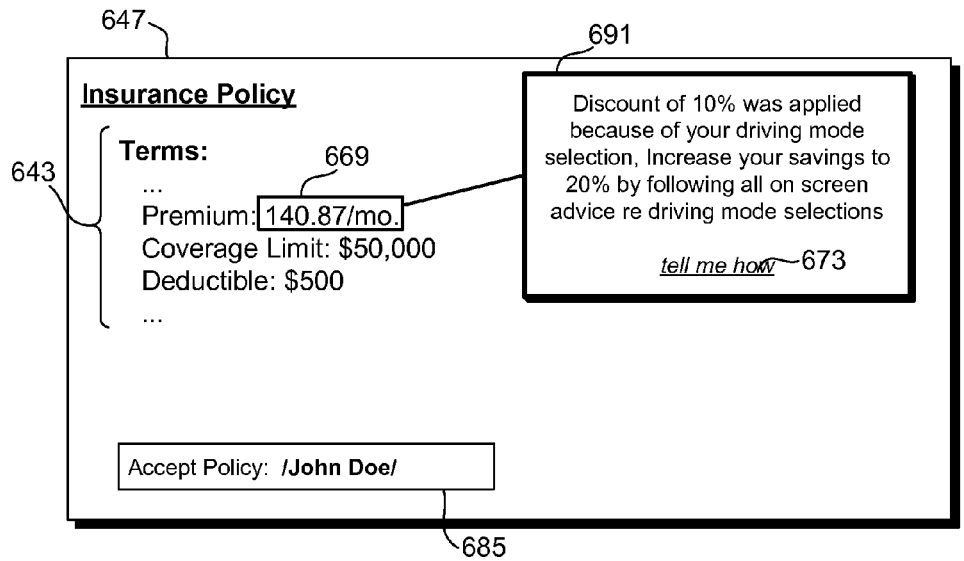
FIG. 6A depicts one embodiment of a document corresponding to an insurance policy data structure that comprises a property based, at least in part, on a characteristic of an autonomous drive mode selection system.

FIG. 6A depicts one example of a document 647 comprising information corresponding to the insurance policy data structure. The document 647 may be embodied as machine-readable data (e.g., markup data or the like), that is adapted for presentation on a display of a computing device. Alternatively, the document 647 may be embodied on a tangible media, such as a disk, Universal Serial Bus (USB) storage device, paper, or the like.

The document 647 may include a human-readable listing of various properties (e.g., terms) 643 of the policy. The document 647 may highlight a particular property 669 that is determined, at least in part, based upon one or more characteristics of the autonomous drive mode selection system. As depicted in the FIG. 6A example, the premium 669 of the policy is based upon autonomous drive mode selection system characteristics. The document 647 may include information indicating how the premium 669 is affected by the autonomous drive mode selection system characteristic. In the FIG. 6A example, the document 647 includes a notice 691 that the premium 669 includes a 10 percent discount due to the selection of a particular driving mode of an autonomous drive mode selection system. The notice 691 indicates that premium 669 may be further reduced by always following on-screen advice with regards to autonomous driving mode selections, and may include a link 673 with additional details. Although a particular example of a notice 691 is provided herein, the disclosure is not limited in this regard and could be adapted to use any notification mechanism corresponding to any property 643. For example, in other embodiments, the notice 691 may be communicated in a separate document (e.g., outside of the insurance policy document 647), may include configuration instructions (as opposed to the link 673), and so on. For example, notice 691 may be dynamically displayed during a vehicle operation.

In some embodiments, the document 647 may include an input 685 through which an authorized entity of the insured may indicate acceptance. As shown in the FIG. 6A example, the input 685 may comprise a text input box. However, the disclosure is not limited in this regard and could be adapted to include any suitable acceptance input, including an assumed acceptance based on the operator following the advice.

As discussed above, in some embodiments, a property 643 of the insurance policy data structure may by dynamic, and may change in response to changes to the characteristics of the autonomous drive mode selection system. Accordingly, the insurance module may be configured to access updated characteristics, re-determine the property, and update the insurance policy data structure accordingly. Updated characteristics may be received continuously during operation of the vehicle. For example, the autonomous drive mode selection system may be configured to store and/or transmit characteristics in real-time during operation of the vehicle. Alternatively, or in addition, updated characteristics may be received in a non-continuous and/or non-real-time manner. The characteristics may be received in response to upgrading and/or servicing the autonomous drive mode selection system, vehicle, or the like. The updated characteristics may be obtained from the storage module of the autonomous drive mode selection system, from a network-accessible storage service, from another authorized source, or the like.

The insurance policy module may update a property of the insurance policy data structure in response to updated characteristics. For example, a premium of the insurance policy may be based on the autonomous driving mode selections made via the autonomous drive mode selection system. The premium may be lower when the operator consistently follows insurer provided instructions, or selects a certain autonomous driving mode.

Figure 6B:
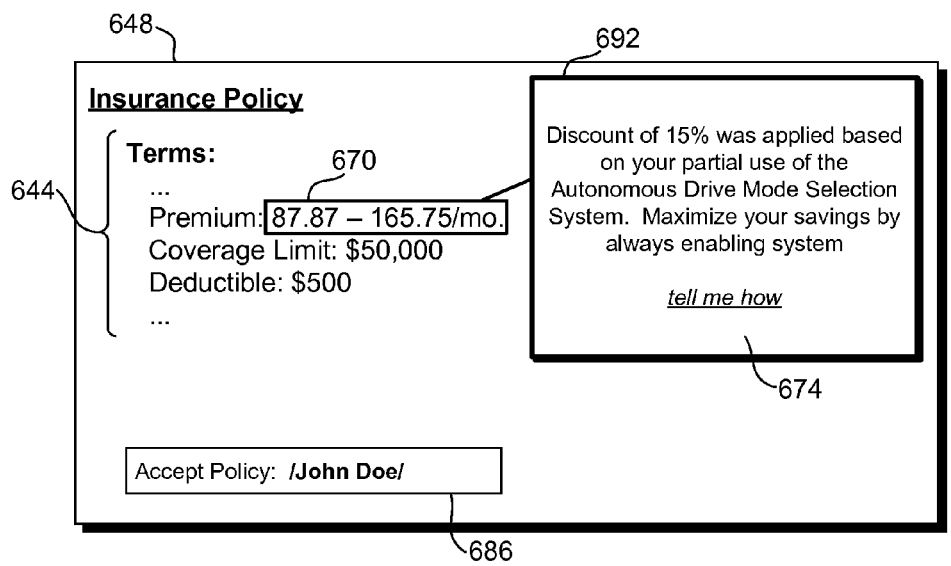
FIG. 6B depicts another embodiment of a document corresponding to an insurance policy data structure that comprises a property based, at least in part, on a characteristic of an autonomous drive mode selection system.

FIG. 6B depicts one example of a document 648 comprising information corresponding to a dynamic property 670 of an insurance policy. The document 648 may list the properties (e.g., terms) 644 of the insurance policy, as described above. The dynamic term 670 is highlighted, and the notice 692 indicates how the dynamic term 670 is affected by the configuration of the autonomous drive mode selection system. The notice 692 indicates that the insured can minimize the premium 670 by always enabling the autonomous drive selection system, and may provide a link 674 to instructions. The document 648 may further comprise an acceptance input 686, as described above.

One or more of the properties of the insurance policy may be determined based on the particular driving mode selection, particular diving mode selections based on external conditions, particular driving mode selections based on operator and/or passenger characteristics, and/or combinations thereof. The document 648 may notify the operator or other authorized entity about how certain properties effect the insurance policy.

Figure 6C:
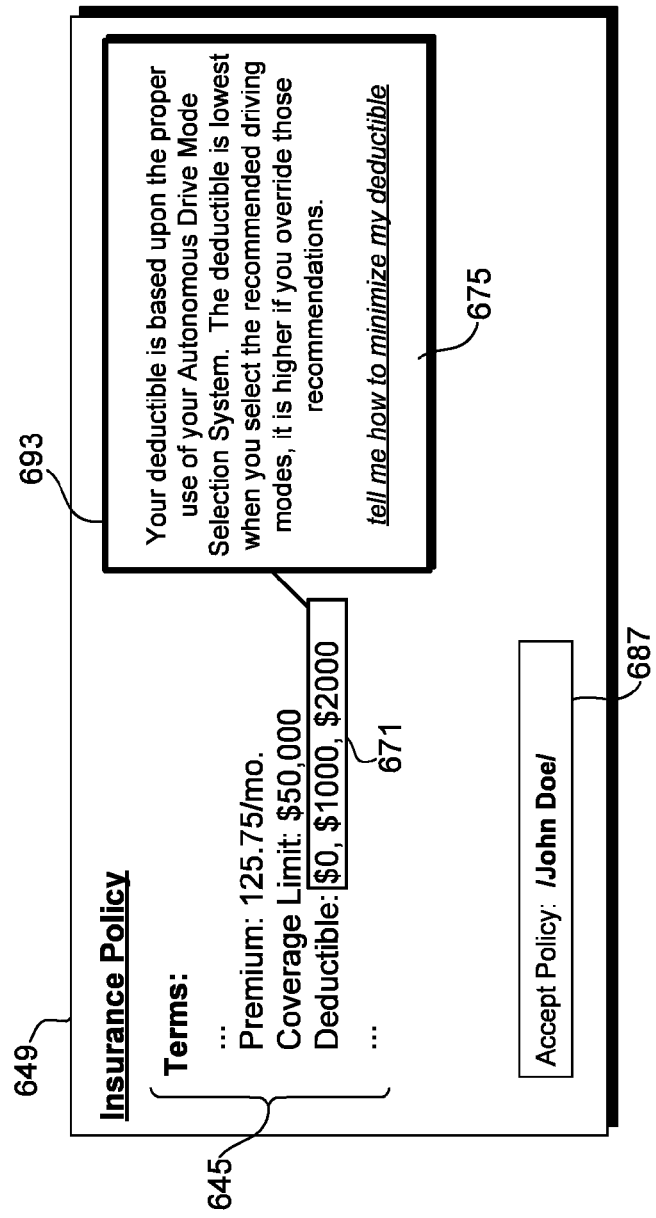
FIG. 6C depicts another embodiment of a document corresponding to an insurance policy data structure that comprises a property based, at least in part, on a characteristic of an autonomous drive mode selection system.

FIG. 6C depicts one example of a document 649 comprising information corresponding to an event-specific property (the insurance policy deductible 671). The document 649 enumerates the properties (e.g., terms) 645 of the policy as described above. The property 671 that defines the coverage of the policy for particular events is highlighted. The property 671 indicates that the deductible for an accident may be $0 to $2,000 depending on the selections made via the autonomous drive mode selection system and/or other system settings. The notice 693 indicates how the characteristics 646 of the autonomous drive mode selection system 101 and/or operator actions affect the deductible 671. The variable deductible property 671 creates an incentive for the insured to allow automatic collision avoidance actions to take place, and discourages overriding and/or disabling such actions. The notice 693 may further include a link 675 to information on how autonomous drive mode selections via the autonomous drive mode selection system effect properties of the insurance policy, such as the deductible 671.

Figure 7:
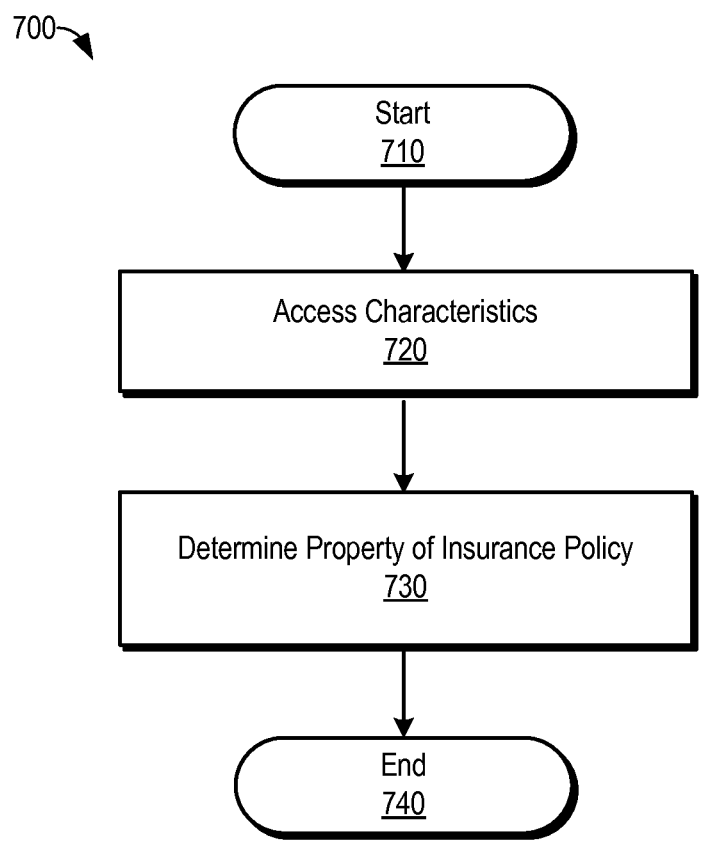
FIG. 7 is a flow diagram of one embodiment of a method for determining a property of an insurance policy based, at least in part, on a characteristic of an autonomous drive mode selection system.

FIG. 7 illustrates a flow chart of one embodiment of a method 700 for determining a property of an insurance policy based upon information pertaining to a characteristic of an autonomous drive mode selection system. At step 710, the method 700 begins. Step 710 may comprise accessing one or more machine-readable instructions in a non-volatile storage media, such as a hard disk, solid-state storage device, or the like. Step 710 may further comprise accessing one or more machine components, such as network interfaces, data storage resources (e.g., database connections), and so on.

Step 720 may comprise accessing and/or receiving information pertaining to the characteristics of an autonomous drive mode selection system. Step 720 may comprise receiving and/or parsing a data structure, such as a data structure as described herein. The characteristics of step 720 may be received using any data communication mechanism including, but not limited to: receiving the characteristics via a wireless network, a wired network, physical transport of media, reading the characteristics from a machine-readable storage medium, accessing the characteristics from a data storage service (e.g., a database, a network-accessible storage service, etc.), or the like. The characteristics of step 720 may comprise capabilities of the autonomous drive mode selection system, a configuration of the autonomous drive mode selection system, autonomous drive mode selections made via the autonomous drive mode selection system, external characteristics, vehicle characteristics, and/or data pertaining to the operating state of the autonomous drive mode selection system.

Step 720 may further comprise verifying and/or decrypting the characteristics. The verification may include, but is not limited to: authenticating a sender of the characteristics, verifying a signature on the characteristics, receiving the characteristics via a secure communication mechanism, and so on.

Step 730 may comprise using the characteristics to determine a property of an insurance policy based, at least in part, upon one or more of the characteristics accessed at step 720. As previously described, step 730 may comprise applying one or more rules to the characteristics to determine the property. Alternatively, or in addition, step 730 may comprise use of one or more lookup tables, policies, expert systems, neural networks, machine-learning algorithms, or the like.

Step 730 may further comprise storing the insurance policy, and the property thereof, on a persistent storage medium. Step 730 may comprise updating a property of the insurance policy data structure, providing the property to authorized entities of the insured and/or insurer, receiving acceptance of the insurance policy (e.g., formalizing the insurance policy), and so on, as described above. The method ends at step 740.

Figure 8:
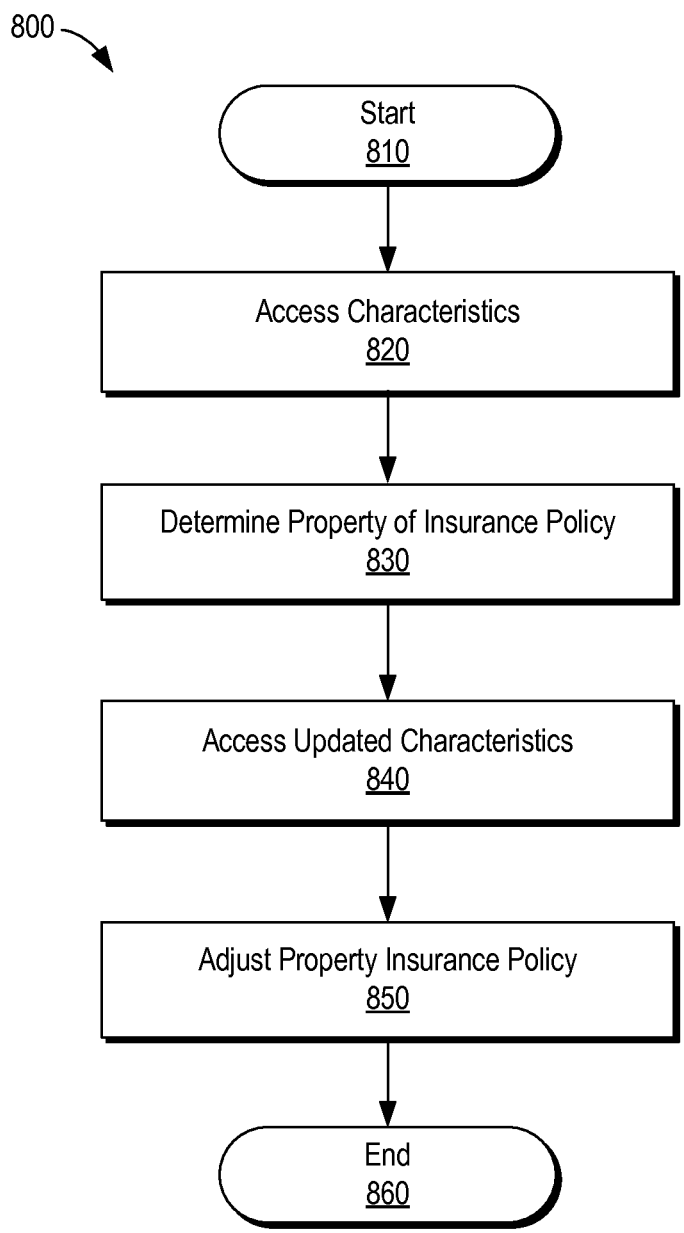
FIG. 8 is a flow diagram of another embodiment of a method for determining a property of an insurance policy based, at least in part, on a characteristic of an autonomous drive mode selection system.

FIG. 8 illustrates a flow chart of another embodiment of a method 800 for determining a property of an insurance policy based upon information pertaining to a characteristic of an autonomous drive mode selection system. At step 810, the method 800 is started and initialized, as described above.

Steps 820 and 830 may comprise accessing characteristics pertaining to a vehicle autonomous drive mode selection system, and determining a property of an insurance policy, as described above. Step 830 may comprise accessing updated characteristics pertaining to the autonomous drive mode selection system, operator(s), passenger(s), vehicle, and/or external condition(s). The characteristics of step 830 may be received in response to continuous, real-time monitoring of the autonomous drive mode selection system. As described above, the communication module of the autonomous drive mode selection system may be configured to transmit real-time configuration and/or operating state information to the insurance policy module via a network. The updated characteristics may comprise indications of changes to the configuration of the autonomous drive mode selection system, usage (e.g., operating state) of the autonomous drive mode selection system and/or vehicle. For example, the updated characteristics may include changes in the selection of autonomous driving mode via the autonomous drive mode selection system, or the enablement of the autonomous drive mode selection system.

Alternatively, the characteristics of step 830 may be received in response to a periodic update (non-continuous and/or non-real-time); for example, in response to upgrading the autonomous drive mode selection system, changing a capability of the autonomous drive mode selection system (e.g., upgrading the sensing system), reconfiguring the autonomous drive mode selection system, servicing and/or updating the vehicle, renewing and/or updating the insurance policy, or the like. The updated characteristics may be obtained from the storage module of the autonomous drive mode selection system, from a network-accessible storage service, from another authorized source, or the like. Step 840 may further comprise verifying and/or decrypting the characteristics, as described above.

Step 850 may comprise adjusting a property of the insurance policy in response to the updated characteristics of step 840. Adjusting the property may comprise re-applying one or more rules, applying an expert system (or other automated process), or the like. Step 850 may further comprise storing the adjusting property on a persistent, machine-readable storage medium, generating document(s) comprising the updated property, and so on. In some embodiments, the update may require acceptance from authorized entities of the insured and/or insurer. Accordingly, step 850 may comprise the formalization module (or other entity) requesting and/or receiving acceptance of the adjusted property. The method ends at step 860, until further updates to the characteristics are received at step 840.

Figure 9:
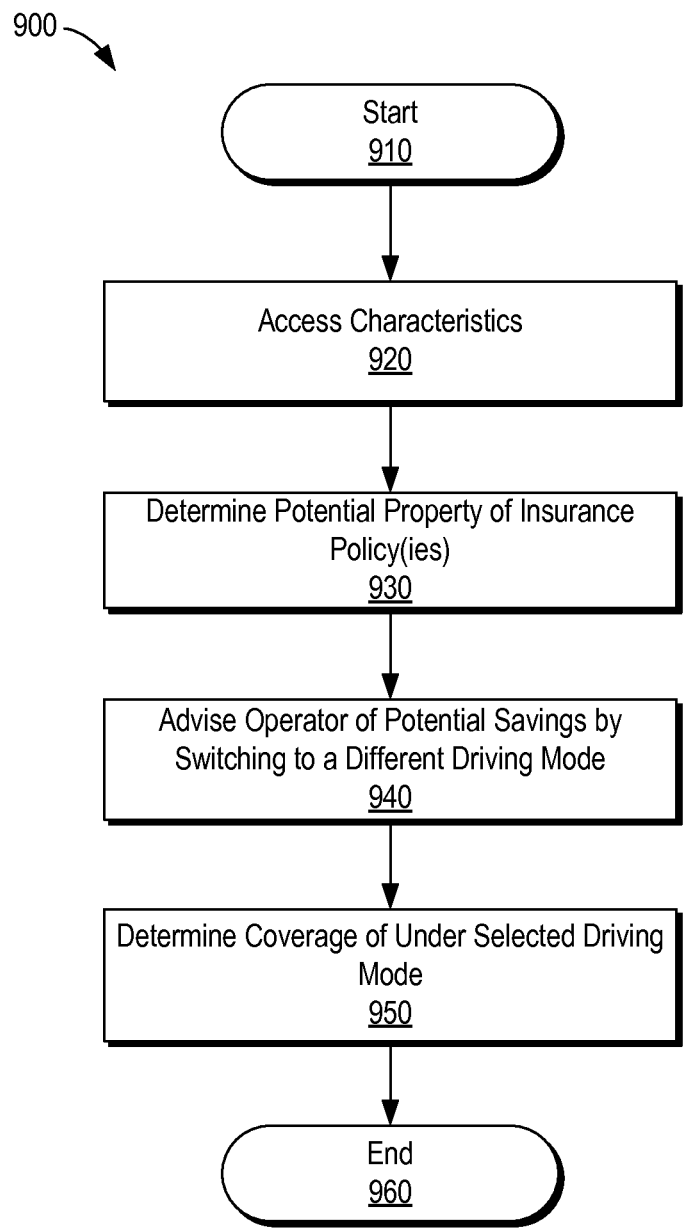
FIG. 9 is a flow diagram of one embodiment of a method for determining a property of an insurance policy based, at least in part, on a characteristic of an autonomous drive mode selection system.

FIG. 9 illustrates a flow chart of one embodiment of a method 900 for determining the coverage of an event under an insurance policy based, at least in part, on characteristics pertaining to the autonomous drive mode selection system, operator(s), passenger(s), vehicle, and/or external condition(s). At step 910, the method 900 is started and is initialized, as described above. Steps 920 and 930 may comprise accessing characteristics described above and determining a property of an insurance policy.

Step 940 may comprise advising an operator, or other entity, of potential savings by switching to a different driving mode. For example, an operator may be advised that by switching to a different autonomous driving mode, the operator may receive more favorable terms for one or more properties of one or more insurance policies. At step 950, the operator, or other entity, may follow the advice and the coverage (i.e., a property) of the insurance policy may be determined for the newly selected autonomous driving mode. The method ends at step 960. According to various embodiments, the insurance policy may be dynamically updated based on changing characteristics pertaining to the autonomous drive mode selection system, operator(s), passenger(s), vehicle, and/or external condition(s). Similarly, the autonomous drive mode selection system may provide advice, notice, and/or warnings about (potential) changes to one or more properties of an insurance policy based on a (potential) selection of an autonomous driving mode made via the autonomous drive mode selection system.

Figure 10A:
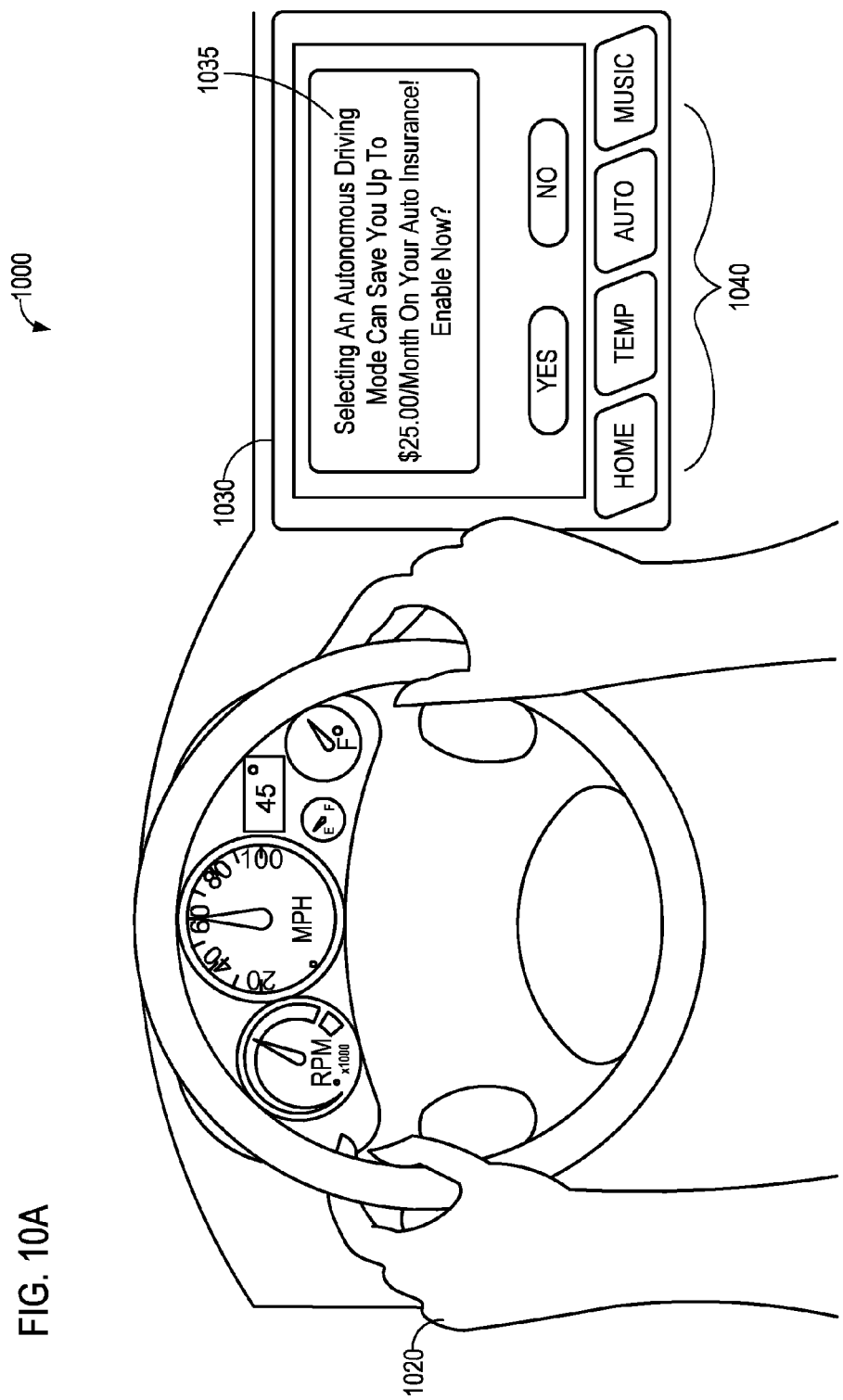
FIG. 10A illustrates an operator's view of an interior of a vehicle, including an embodiment of an autonomous drive mode selection system advising the operator with respect to a property of an insurance policy.

FIG. 10A illustrates an example of a notice 1035 to an operator 1020 that a property (e.g., the monthly premium) of an insurance policy could change if an autonomous driving mode is enabled. The notice 1035 may be provided via a screen 1030 that is configured to serve multiple purposes 1040. In alternative embodiments, notice and/or selections associated with the autonomous drive mode selection system 1000 may be made using other inputs and/or mechanisms in place of screen 1030.

Figure 10B:
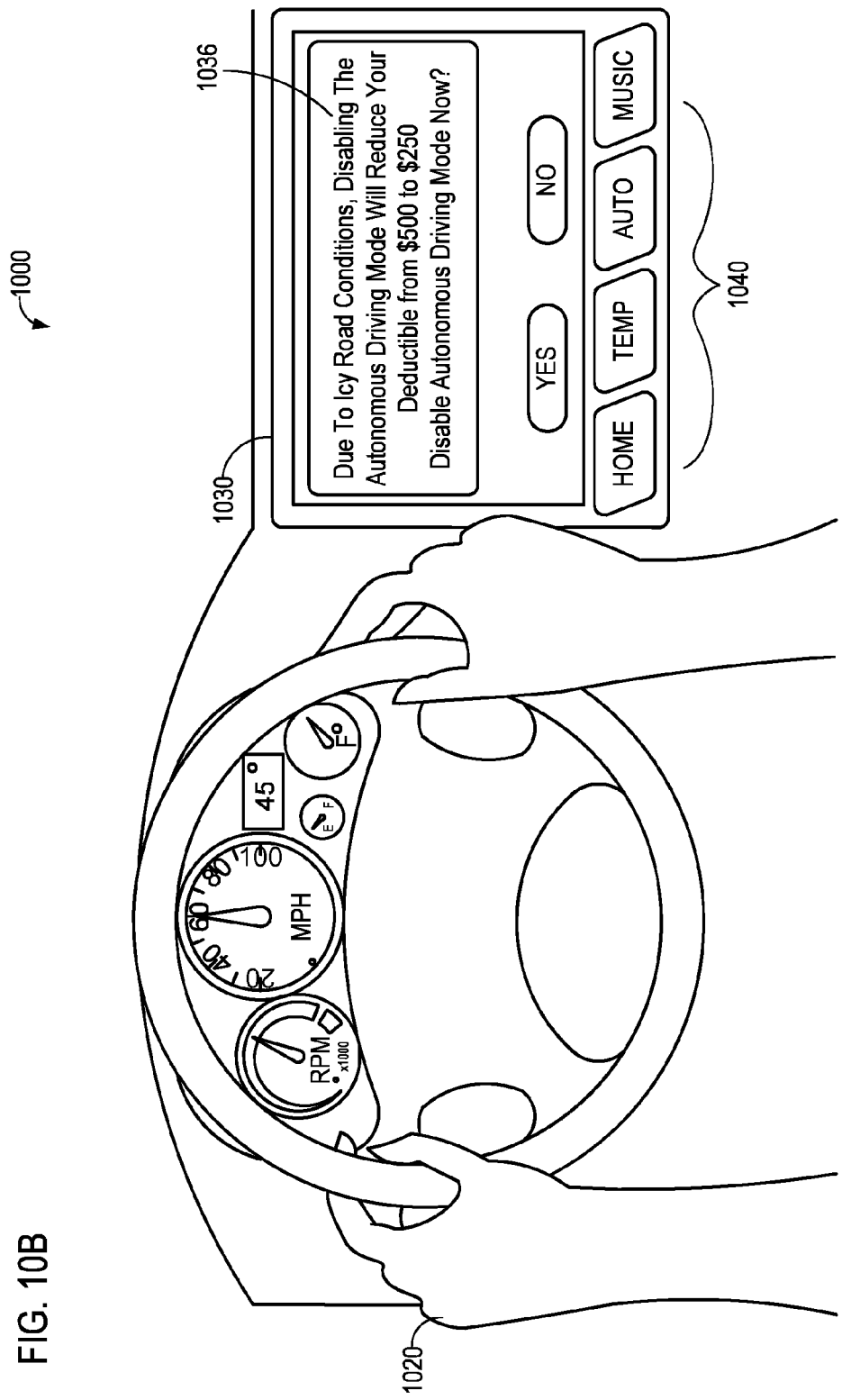
FIG. 10B illustrates an operator's view of an interior of a vehicle, including another embodiment of an autonomous drive mode selection system advising the operator with respect to a property of an insurance policy.

FIG. 10B illustrates an alternative embodiment, in which the operator 1020 is notified 1036 that due to icy road conditions (an external characteristic) disabling the autonomous drive mode selection system 1000 will reduce the deductible from $500 to $250. Numerous permutations of notices, options, characteristic considerations, autonomous driving modes, and/or other factors may be taken into consideration and/or used by the autonomous drive mode selection system 1000.

Figure 11:
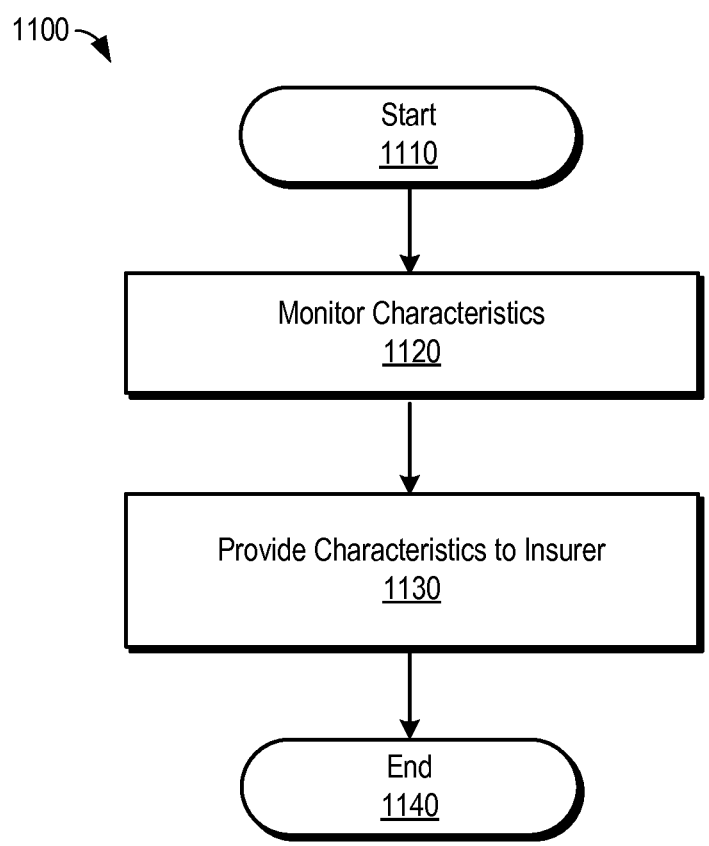
FIG. 11 is a flow diagram of one embodiment of a method for determining a property of an insurance policy based, at least in part, on a characteristic of an autonomous drive mode selection system.

FIG. 11 is a flow diagram of another embodiment for determining a property of an insurance policy based, at least in part, on a characteristic of an autonomous drive mode selection system. At step 1110, the method 1100 may start and be initialized as described above.

Step 1120 may comprise monitoring characteristics of an autonomous drive mode selection system. The characteristics may be monitored by a dedicated monitoring module or other entity (e.g., the processing module, storage module, or the like). The characteristics may be embodied on a data structure, such as the data structure described above. The characteristics may include, on characteristics pertaining to the autonomous drive mode selection system, operator(s), passenger(s), vehicle, and/or external condition(s), and so on.

The monitoring of step 1120 may be periodic, aperiodic, continuous, real-time, or the like. In some embodiments, the monitoring of step 1120 occurs in response to a user request (e.g., a command from an operator and/or owner of the vehicle). In some embodiments, the monitoring of step 1120 occurs in response to servicing the vehicle, reconfiguring the vehicle, servicing the autonomous drive mode selection system, changing the capabilities of the autonomous drive mode selection system (e.g., upgrading the processing module of the autonomous drive mode selection system), changing a configuration of the autonomous drive mode selection system, making an autonomous driving mode selection via the autonomous drive mode selection system, enabling the autonomous drive mode selection system, disabling the autonomous drive mode selection system, or the like, as described above. Alternatively, or in addition, the monitoring of step 1120 may occur continuously (in real-time) while the vehicle is in operation and/or always.

Step 1130 may comprise providing the characteristic to an insurer (and/or agent thereof), such as the insurance policy module described herein. Providing the characteristic at step 1130 may comprise storing the characteristic on a persistent, machine-readable storage medium of the vehicle (e.g., a storage medium), transmitting the characteristic to a network-accessible storage service via a network, transmitting the characteristic to the insurance policy module via the network, or the like. Step 1130 may further comprise signing the characteristic, encrypting the characteristic, or the like. In some embodiments, step 1130 may comprise providing an authentication credential with the characteristic, such as a signature and public key certificate, passcode, or the like. Alternatively, or in addition, step 1130 may comprise transmitting the characteristic using a secure communication mechanism, such as SSL and/or mutually authenticated SSL. The method ends at step 1140.

In response to receiving the characteristic, the insurer may determine a property of an insurance policy, adjust a property of the insurance policy, determine a property of the insurance policy (e.g., coverage of the insurance policy) for a particular event, and/or provide a notice, a warning, an instruction and/or advice to an operator, or the like, as described herein.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps).

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A method, comprising:
monitoring a characteristic of an autonomous drive mode selection system of a vehicle via an electronic monitoring system;
electronically providing real-time advice to an operator suggesting a modification to the monitored characteristic of the autonomous drive mode selection system, wherein the implementation of the suggested modification to the monitored characteristic will change a property of an insurance policy; and
providing information pertaining to the characteristic to an insurer of the insurance policy in response to the operator implementing the suggested modification to the monitored characteristic of the autonomous drive mode selection system.

2. The method of claim 1, further comprising transmitting the information pertaining to the characteristic to the insurer via a communication network.

3. The method of claim 1, further comprising encrypting the information pertaining to the characteristic.

4. The method of claim 1, wherein monitoring comprises monitoring real-time information pertaining to the characteristic of the autonomous drive mode selection system during vehicle operation.

5. The method of claim 4, further comprising providing the real-time information pertaining to the characteristic of the autonomous drive mode selection system to the insurer.

6. The method of claim 1, wherein the insurer uses the information pertaining to the characteristic to determine a property of an insurance policy.

7. The method of claim 6, wherein the insurance policy comprises a vehicle insurance policy.

8. The method of claim 1, wherein the characteristic relates to a selection of an autonomous driving mode selected via the autonomous drive mode selection system.

9. The method of claim 8, wherein the autonomous drive mode selection system comprises at least one selectable autonomous driving mode.

10. The method of claim 9, wherein the autonomous driving mode comprises a local robotically-controlled mode.

11. The method of claim 9, wherein the autonomous driving mode comprises a remote manually-controlled mode.

12. The method of claim 9, wherein the autonomous driving mode comprises a remote robotically-controlled mode.

13. The method of claim 1, wherein the characteristic of the autonomous drive mode selection system comprises an indication of whether the autonomous drive mode selection system has been overridden by an operator of the vehicle.

14. The method of claim 1, wherein the real-time advice comprises an instruction to select a remote manually-controlled mode via the autonomous drive mode selection system.

15. The method of claim 1, wherein the real-time advice comprises an instruction to select a local robotically-controlled mode via the autonomous drive mode selection system.

16. The method of claim 1, further comprising providing information pertaining to an operator condition associated with an operator of the vehicle to the insurer of the insurance policy.

17. The method of claim 1, further comprising:
monitoring an external condition associated with the vehicle; and
providing information pertaining to the external condition to the insurer of the insurance policy.

18. The method of claim 17, wherein the external condition comprises a weather condition.

19. The method of claim 1, wherein the characteristic comprises a history of characteristics of the autonomous drive mode selection system.

20. A system, comprising:
a processor;
an electronic monitoring module in communication with the processor, the monitoring module configured to electronically monitor a characteristic of a drive mode selection system of a vehicle;
a notification module in communication with the processor, the notification module configured to provide real-time advice to an operator suggesting a modification to the monitored characteristic of the drive mode selection system, wherein the implementation of the suggested modification is configured to change a property of an insurance policy; and
a communication module in communication with the processor, the communication module configured to provide information pertaining to the characteristic to an insurer of the insurance policy in response to the operator implementing the suggested modification to the monitored characteristic of the autonomous drive mode selection system.

21. The system of claim 20, wherein the communication module is configured to transmit the information pertaining to the characteristic to the insurer via a communication network.

22. The system of claim 20, wherein the communication module is configured to encrypt the characteristic.

23. The system of claim 20, wherein the insurer uses the information pertaining to the characteristic to determine a property of an insurance policy.

24. The system of claim 23, wherein the property of the insurance policy comprises a premium for the insurance policy.

25. The system of claim 23, wherein the property of the insurance policy comprises a coverage limitation of the insurance policy.

26. The system of claim 20, wherein the characteristic relates to a selection of an autonomous driving mode selected via the autonomous drive mode selection system, and wherein autonomous drive mode selection system comprises at least one selectable autonomous driving mode, including a remote manually-controlled mode.

27. The system of claim 20, wherein the characteristic relates to a selection of an autonomous driving mode selected via the autonomous drive mode selection system, and wherein autonomous drive mode selection system comprises at least one selectable autonomous driving mode, including a remote robotically-controlled mode.

28. The system of claim 20, wherein the characteristic relates to which of a plurality of autonomous driving modes is selected via the autonomous drive mode selection system.

29. The system of claim 28, wherein the autonomous drive mode selection system comprises at least two selectable autonomous driving modes.

30. The system of claim 29, wherein one of the at least two selectable autonomous driving modes comprises a local robotically-controlled mode.

31. The system of claim 29, wherein one of the at least two selectable autonomous driving modes comprises a remote manually-controlled mode.

32. The system of claim 29, wherein one of the at least two selectable autonomous driving modes comprises a remote robotically-controlled mode.

33. The system of claim 20, further comprising a notification system configured to provide information relating to a property of the insurance policy to an operator of the vehicle.

34. The system of claim 33, wherein the notification system is configured to provide an alert in order to indicate an effect on the property of an autonomous driving mode selection selected via the autonomous drive mode selection system.

35. The system of claim 34, wherein the alert comprises a visual indication of a change in the property of the insurance policy on a heads-up display of the vehicle.

36. A non-transitory machine-readable storage medium comprising program code that is configured to cause a processor to perform operations, the operations comprising:
monitoring a characteristic of a drive mode selection system of a vehicle via an electronic monitoring system;
electronically providing real-time advice to an operator suggesting a modification to the monitored characteristic of the drive mode selection system, wherein the implementation of the suggested modification to the monitored characteristic will change a property of an insurance policy; and
providing the information pertaining to the characteristic to an insurer of the insurance policy in response to the operator implementing the suggested modification to the monitored characteristic of the drive mode selection system.

37. The method of claim 1, wherein the property of the insurance policy comprises a coverage amount of the insurance policy, such that the implementation of the suggested modification to the monitored characteristic will change a coverage amount of the insurance policy.

38. The method of claim 1, wherein the property of the insurance policy comprises a coverage scope of the insurance policy, such that the implementation of the suggested modification to the monitored characteristic will change a coverage scope of the insurance policy.

39. The method of claim 1, wherein the property of the insurance policy comprises a deductible of the insurance policy, such that the implementation of the suggested modification to the monitored characteristic will change a deductible of the insurance policy.

40. The method of claim 1, wherein the property of the insurance policy comprises a rider of the insurance policy, such that the implementation of the suggested modification to the monitored characteristic will change a rider of the insurance policy.

* * * * *